(12) United States Patent
McDysan et al.

(10) Patent No.: US 8,131,853 B2
(45) Date of Patent: Mar. 6, 2012

(54) EXTERNAL PROCESSOR FOR A DISTRIBUTED NETWORK ACCESS SYSTEM

(75) Inventors: Dave McDysan, Herndon, VA (US); Howard Lee Thomas, Ballwin, MO (US); Lei Yao, Arlington, VA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 0 days.

(21) Appl. No.: 12/633,543

(22) Filed: Dec. 8, 2009

(65) Prior Publication Data

US 2010/0211678 A1 Aug. 19, 2010

Related U.S. Application Data

(63) Continuation of application No. 09/723,501, filed on Nov. 28, 2000, now Pat. No. 7,657,628.

(51) Int. Cl.
*G06F 15/16* (2006.01)
(52) U.S. Cl. .......................... 709/225; 709/200; 709/249
(58) Field of Classification Search .......... 709/223–225, 709/230, 200–202, 227, 249
See application file for complete search history.

(56) References Cited

U.S. PATENT DOCUMENTS

| | | |
|---|---|---|
| 4,899,333 A | 2/1990 | Roediger |
| 5,027,269 A | 6/1991 | Grant et al. |
| 5,058,056 A | 10/1991 | Hammer et al. |
| 5,115,432 A | 5/1992 | Haas |
| 5,251,205 A | 10/1993 | Callon et al. |
| 5,490,252 A | 2/1996 | Macera et al. |
| 5,537,546 A | 7/1996 | Sauter |
| 5,541,911 A | 7/1996 | Nilakantan et al. |
| 5,737,526 A | 4/1998 | Periasamy et al. |
| 5,742,607 A | 4/1998 | Beighe et al. |
| 5,835,727 A | 11/1998 | Wong et al. |
| 5,842,040 A | 11/1998 | Hughes et al. |
| 5,920,566 A | 7/1999 | Hendel et al. |
| 5,933,605 A | 8/1999 | Kawano et al. |
| 5,938,736 A | 8/1999 | Muller et al. |
| 5,968,176 A | 10/1999 | Nessett et al. |
| 5,996,021 A | 11/1999 | Civanlar et al. |
| 6,055,561 A | 4/2000 | Feldman et al. |
| 6,081,522 A | 6/2000 | Hendel et al. |
| 6,094,435 A | 7/2000 | Hoffman et al. |
| 6,141,686 A | 10/2000 | Jackowski et al. |
| 6,157,955 A | 12/2000 | Narad et al. |
| 6,161,145 A | 12/2000 | Bainbridge et al. |
| 6,167,445 A * | 12/2000 | Gai et al. ...................... 709/223 |
| 6,175,874 B1 | 1/2001 | Imai et al. |
| 6,219,706 B1 | 4/2001 | Fan et al. |
| 6,233,245 B1 | 5/2001 | Chapman et al. |

(Continued)

*Primary Examiner* — Moustafa M Meky

(57) ABSTRACT

An external processor for a network access system having a programmable access device includes a service controller that provides at least one service for network traffic, a message processor that processes network messages for service processing by the service controller, and a programmable access device controller that programs the programmable access device in response to service controller processing. It is advantageous for the external processor to include primary and secondary service controllers for a particular service so that, if the primary service controller fails, the secondary service controller can provide the particular service for message received from the programmable access device. In preferred embodiments, the service controller further includes a reporting processor that provides an interface through which reporting messages received from the programmable access device can be communicated to the service controller and a signaling controller that transmits signals to configure network hardware to establish requested network connections. The external processor preferably further supports a service policy interface through which the service controller can request policy decisions from a possibly remote policy server.

20 Claims, 29 Drawing Sheets

U.S. PATENT DOCUMENTS

| | | |
|---|---|---|
| 6,286,035 B1 | 9/2001 | Gillis et al. |
| 6,286,052 B1 | 9/2001 | McCloghrie et al. |
| 6,304,893 B1 | 10/2001 | Gish |
| 6,311,215 B1 | 10/2001 | Bakshi et al. |
| 6,321,338 B1 | 11/2001 | Porras et al. |
| 6,366,577 B1 | 4/2002 | Donovan |
| 6,370,151 B1 | 4/2002 | Bojanic |
| 6,424,659 B2 | 7/2002 | Viswanadham et al. |
| 6,434,618 B1 | 8/2002 | Cohen et al. |
| 6,442,547 B1 | 8/2002 | Bowman-Amuah |
| 6,452,915 B1 | 9/2002 | Jorgensen |
| 6,466,976 B1 | 10/2002 | Alles et al. |
| 6,487,170 B1 | 11/2002 | Chen et al. |
| 6,505,244 B1 | 1/2003 | Natarajan et al. |
| 6,532,241 B1 | 3/2003 | Ferguson et al. |
| 6,539,425 B1 | 3/2003 | Stevens et al. |
| 6,542,508 B1 | 4/2003 | Lin |
| 6,570,884 B1 | 5/2003 | Connery et al. |
| 6,578,076 B1 | 6/2003 | Putzolu |
| 6,584,508 B1 | 6/2003 | Epstein et al. |
| 6,587,466 B1 | 7/2003 | Bhattacharya et al. |
| 6,598,034 B1 | 7/2003 | Kloth |
| 6,601,101 B1 | 7/2003 | Lee et al. |
| 6,606,316 B1 | 8/2003 | Albert et al. |
| 6,611,872 B1 | 8/2003 | McCanne |
| 6,625,150 B1 | 9/2003 | Yu |
| 6,631,414 B2 | 10/2003 | Bullock et al. |
| 6,651,096 B1 | 11/2003 | Gai et al. |
| 6,665,495 B1 | 12/2003 | Miles et al. |
| 6,674,743 B1 | 1/2004 | Amara et al. |
| 6,680,943 B1 | 1/2004 | Gibson et al. |
| 6,697,857 B1 | 2/2004 | Dixon et al. |
| 6,765,927 B1 | 7/2004 | Martin et al. |
| 6,771,673 B1 | 8/2004 | Baum et al. |
| 6,775,689 B1 | 8/2004 | Raghunandan |
| 6,788,647 B1 | 9/2004 | Mohaban et al. |
| 6,836,462 B1 | 12/2004 | Albert et al. |
| 6,839,350 B1 | 1/2005 | Inouchi et al. |
| 7,088,720 B1 | 8/2006 | Schneider et al. |
| 7,133,403 B1 | 11/2006 | Mo et al. |
| 7,194,426 B1 * | 3/2007 | Box ................................. 705/26 |
| 7,657,628 B1 | 2/2010 | McDysan et al. |
| 7,889,717 B2 | 2/2011 | Schneider et al. |
| 2006/0005229 A1* | 1/2006 | Palekar et al. .................... 726/1 |
| 2006/0239268 A1 | 10/2006 | Schneider et al. |
| 2006/0259949 A1* | 11/2006 | Schaefer et al. .................. 726/1 |

* cited by examiner

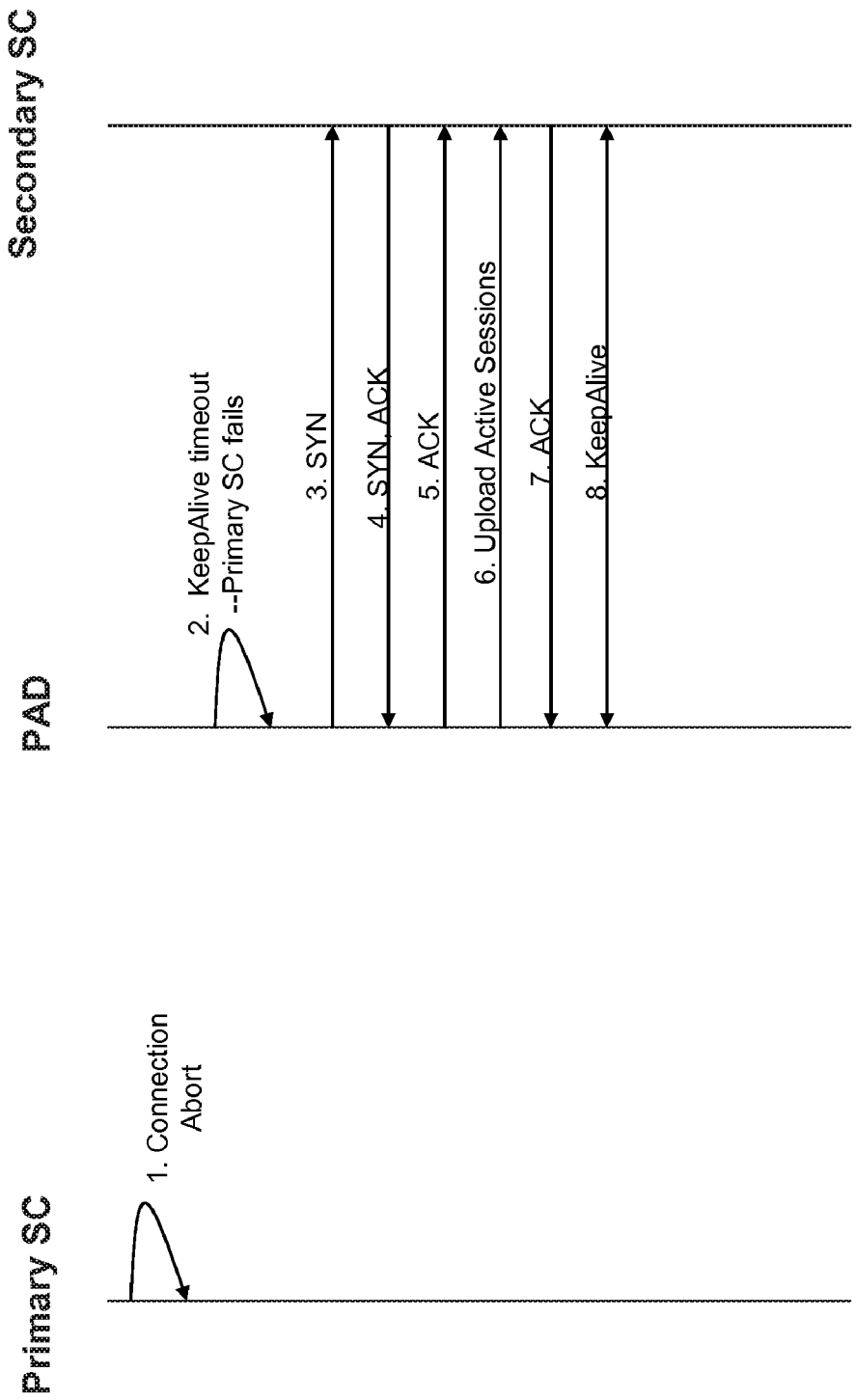

EXTERNAL PROCESSOR FOR A DISTRIBUTED NETWORK ACCESS SYSTEM

CROSS-REFERENCE TO RELATED APPLICATIONS

This application is a continuation of application Ser. No. 09/723,501, filed Nov. 28, 2000, the entirety of which is incorporated herein by reference.

BACKGROUND OF THE INVENTION

1. Technical Field

The present invention relates in general to communication networks and, in particular, to an IP-centric communication network. Still more particularly, the present invention relates to an IP-based communication network including a network access system having distributed and separated routing, signaling, service control, filtering, policy control and other functionality from IP forwarding.

2. Description of the Related Art

The Internet can generally be defined as a worldwide collection of heterogeneous communication networks and associated gateways, bridges and routers that all employ the TCP/IP (Transport Control Protocol/Internet Protocol) suite of protocols to communicate data packets between a source and one or more destinations. As is well known to those skilled in the art, the TCP/IP suite of protocols corresponds to layers 3 and 4 (the network and transport layers, respectively) of the seven-layer International Organization for Standardization Open Systems Interconnection (ISO/OSI) reference model, which provides a convenient framework for discussing communication protocols. The ISO/OSI reference model further includes physical and link layers (layers 1 and 2, respectively) below the network and transport layers, and session, presentation, and application layers (layers 5 through 7, respectively) above the network and transport layers.

FIG. 1A illustrates a metropolitan level view of an Internet Service Provider (ISP) network 10 through which customers can access the Internet. Starting from the left hand side, many customer Local Area Networks (LANs) 14 interface to ISP network 10 via a variety of metropolitan access networks 16, which employ any of a number of network technologies; for example, Time Division Multiplexing (TDM), Asynchronous Transfer Mode (ATM), and Ethernet. Furthermore, as is typical in larger metropolitan areas, there are multiple levels of hierarchy in metropolitan access networks 16, with multiple rings connecting each customer to an aggregation site and multiple lowest level aggregation sites feeding a higher-level aggregation site. Typically, there may be only a few aggregation sites where aggregation routers 12 are deployed in a metropolitan area. FIG. 1A shows only one such aggregation site 17. All traffic from a customer LAN 14 is backhauled via these aggregation networks to this aggregation site 17, where aggregation routers 12 apply policy-driven treatment such as policing, marking, and admission control. Aggregation routers then route the traffic either back to another customer LAN 14, or else to core router 18 for transmission across core 20 to some more distant destination.

The state of the art in router design to a large extent dictates the network design shown in FIG. 1A because routers are expensive and must operate on highly aggregated traffic flows. A principal consideration in the design of such networks is to minimize the number of routers so that the routing protocol will scale effectively. This means that a number of functions are concentrated in these routers: routing, policy database storage, and policy enforcement.

In the prior art, router architecture is generally monolithic and proprietary. Consequently, the range of data services that a service provider can offer in addition to basic packet routing is limited by the control software offered by router vendors. In addition, the packet-processing throughput of a router is generally limited by its originally installed processing hardware and cannot be expanded or extended without replacement of the entire router. The monolithic and proprietary design of conventional routers presents a number of problems addressed by the present invention.

First, because routers traditionally have a single controller providing all services for all message types, edge router controllers tend to be quite complex, making it difficult and expensive to add new services or modify existing services. As a result, the time to market for new router-based services is extended and is usually dependent upon vendors responding to service provider requests to implement new services within their proprietary router architectures.

Second, conventional monolithic router architectures are not readily scalable, which presents a significant problem for service providers, particularly in light of the phenomenal growth of Internet traffic. Consequently, the processing capabilities of deployed routers cannot easily be scaled to keep pace with increasing traffic. Instead, service providers must purchase additional or replacement routers to meet the demands of increased traffic.

Third, conventional monolithic router designs also have limited flexibility and extensibility. For example, the present invention recognizes that it would be desirable, in view of the rapid growth of Internet traffic, to dynamically provision, configure, and/or reallocate access capacity to IP-based services. Because access capacity is necessarily limited and providing additional access capacity is a major cost component of networks, the enforcement of intelligent admission control policies and provision of differing qualities of service is vital to the efficient utilization of available access capacity. However, conventional edge routers are not capable of classifying a wide variety of traffic types while enforcing policy controls or of responding to dynamic requests for capacity, and this functionality is difficult to incorporate within currently deployed monolithic edge routers. The present invention accordingly recognizes that it would be desirable to provide the above as well as additional policy control, network monitoring, diagnostic, and security services in commercialized hardware, while permitting these services to be tailored to meet the needs of individual customers and service providers.

Fourth, because of the proprietary nature of router architectures and services, if a service provider deploys routers from multiple vendors in a communication network, the proprietary services implemented by the different router vendors will not necessarily inter-operate. Consequently, service providers are not able to purchase routers and switches from one vendor and purchase service control software from another vendor. Furthermore, a service provider cannot offer its communication network as a platform for a wholesale provider to offer value-added data services utilizing the existing base network capabilities.

In view of the foregoing and additional shortcomings in the prior art, the present invention recognizes that it would be desirable to introduce a new network access architecture that addresses and overcomes the limitations of conventional monolithic router architectures.

SUMMARY OF THE INVENTION

The present invention introduces a distributed network access system architecture including at least an external processor and a programmable access device. In a preferred embodiment, the network access system further includes an access router coupled to the programmable access device.

The external processor includes a service controller that provides at least one service for network traffic, a message processor that processes network messages for service processing by the service controller, and a programmable access device controller that programs the programmable access device in response to service controller processing. It is advantageous for the external processor to include primary and secondary service controllers for a particular service so that, if the primary service controller fails, the secondary service controller can support the particular service on the programmable access device. In preferred embodiments, the service controller further includes a reporting processor that provides an interface through which reporting messages received from the programmable access device can be communicated to the service controller and a signaling controller that forwards signaling messages to the network to establish requested network connections. The external processor preferably further supports a service policy interface through which the service controller can request policy decisions from a possibly remote policy server.

Thus, in accordance with the present invention, conventional monolithic, proprietary edge routers are replaced with a distributed network access system that allocates the functionality of traditional edge routers (as well as additional functionality) among three logical modules: a programmable access device, an external processor, and an access router. According to a preferred embodiment of the present invention, basic routing of packets between input and output ports of the access network is performed by the access router. However, forwarding and generic traffic conditioning functions, such as marking, policing, monitoring, shaping, and filtering, are implemented in the programmable access device, and service functions, such as message interpretation, signaling, admission control, and policy invocation, are implemented in the external processor. As detailed infra, this distribution of functionality results in numerous advantages, including improved scalability, flexibility, extensibility, interoperability, security, and service provisioning.

Additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5A illustrates exemplary signaling between a programmable access device and an external processor during a switchover to a secondary service controller due to failure of the primary service controller;

DETAILED DESCRIPTION OF A PREFERRED EMBODIMENT

Distributed Network Access System Architecture

Figure 1A:
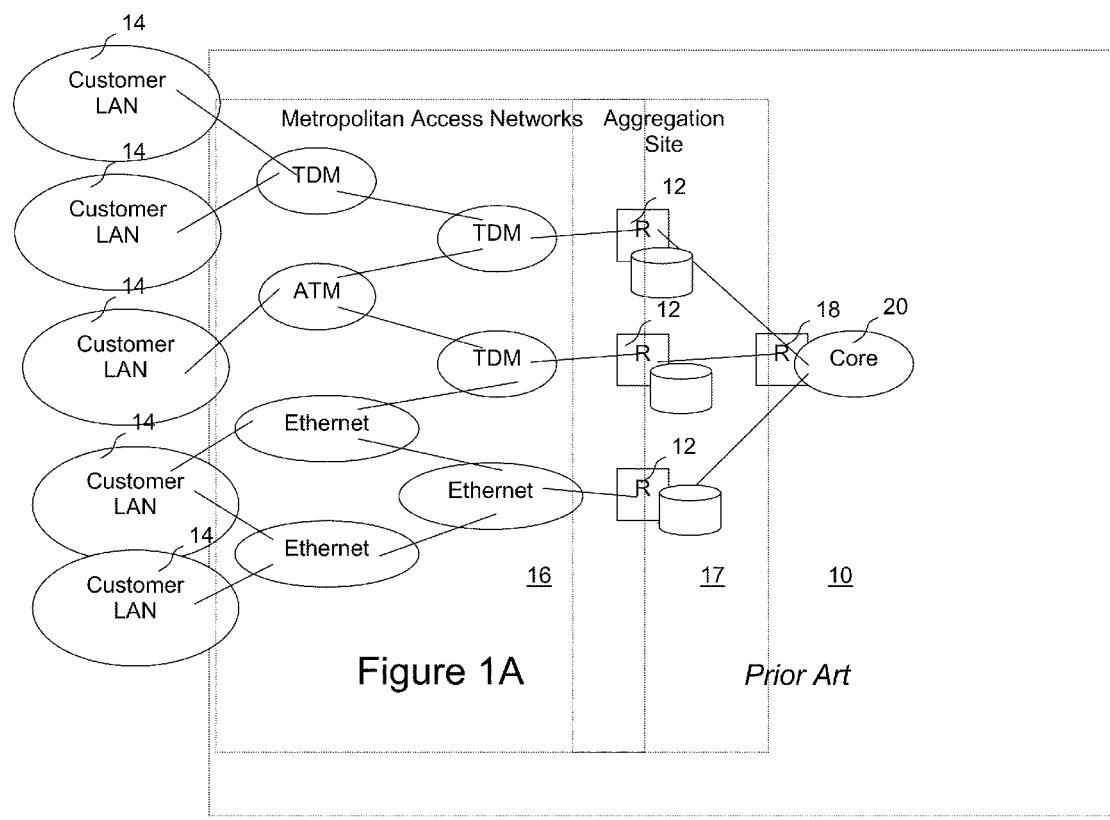
FIG. 1A is a metropolitan view of a prior art Internet service provider network containing aggregation and core routers.
Figure 1B:
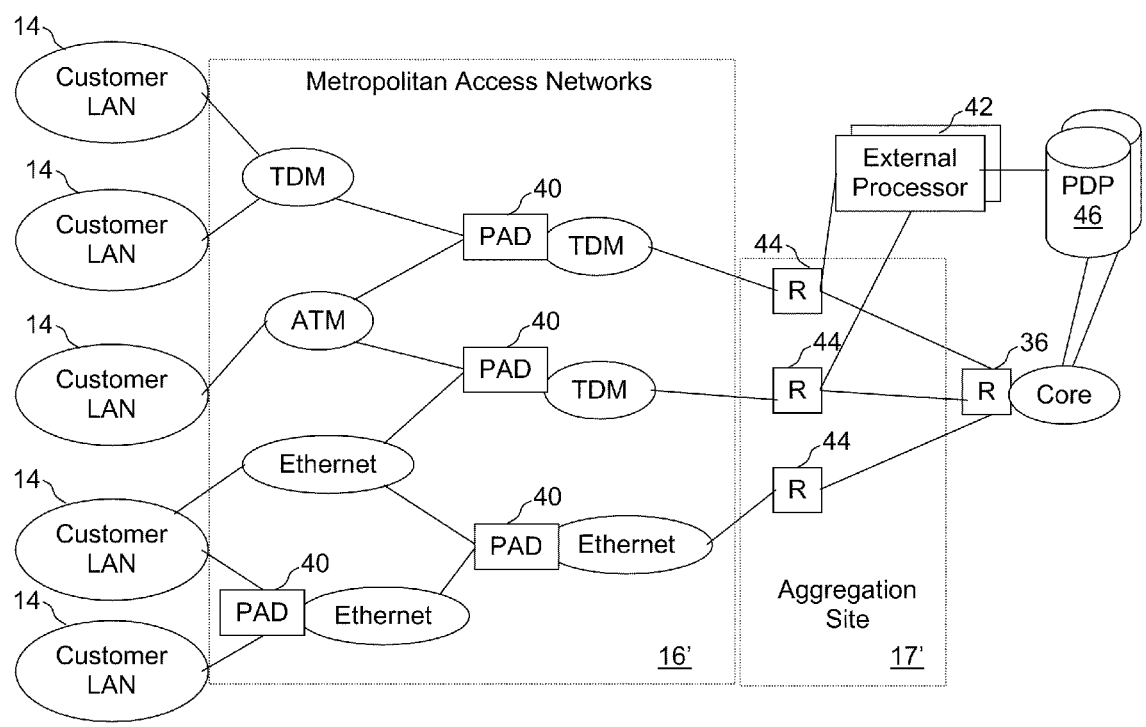
FIG. 1B is a metropolitan view of an Internet service provider network in accordance with the present invention.
Figure 2:
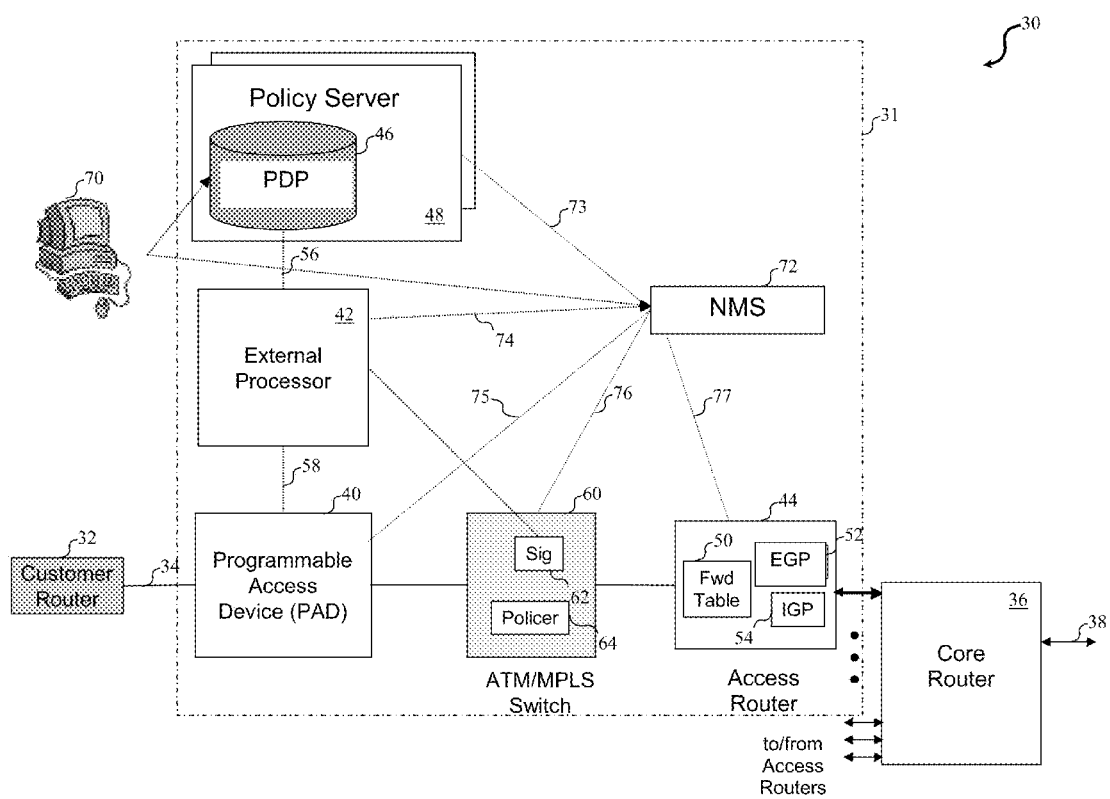
FIG. 2 depicts an illustrative embodiment of a communication network in accordance with the present invention.

With reference again to the figures and in particular with reference to FIG. 2, there is depicted a high-level block diagram of a portion of a communication network 30 having a distributed network access system 31 in accordance with the present invention. As illustrated, communication network 30 may be coupled to equipment of a number of customers (one of which is represented by a customer router 32) by an access line 34. As in FIG. 1, access line 34 may employ any of a number of commonly utilized transport network technologies, such as Ethernet, SONET, ATM and frame relay, and may further include unillustrated aggregation hardware.

As with conventional networks, communication network 30 includes one or more core communication links 38 (e.g., trunk lines) coupled to one or more core routers 36. However, in contrast to conventional communication networks, such as that illustrated in FIG. 1, customer router 32 does not interface to communication network 30 via a monolithic, proprietary edge router. Instead, customer equipment, such as customer router 32, interfaces with communication network 30 via a network access system 31 that distributes the functions of traditional edge routers (as well as additional functionality) among three logical modules: a programmable access device (PAD) 40, an external processor 42, and an access router 44. According to a preferred embodiment of the present invention, basic routing of packets between input and output ports of the access network is performed by access router 44 by reference to forwarding table 50 as determined by Exterior Gateway Protocol (EGP) and Interior Gateway Protocol (IGP) routing tables 52 and 54. However, forwarding and generic traffic conditioning functions, such as marking, policing, monitoring, shaping, and filtering, are implemented in PAD 40, and service functions, such as message interpretation, signaling, admission control, and policy invocation, are implemented in external processor 42. Given this distribution of functionality, incoming and outgoing packets are typically communicated between core communication links 38 and customer router 32 via PAD 40, access router 44, and core router 36 (and optionally additional switching the access network, such as an ATM or MPLS switch 60). However, if the filtering functionality of PAD 40 detects packet flows for which additional services are required, PAD 40 passes appropriate messages to external processor 42 for service processing via a Message, Reporting, and Control Interface (MCRI) 58, which can be accessed via an Application Programming Interface (API) on PAD 40 and external processor 42. Distributing functionality between access router 44, PAD 40, and external processor 42 in this manner gives the service provider (or even third parties) the freedom to extend and modify existing services, create new services, or add more processing power to external processor 42 without adversely affecting the forwarding performance of PAD 40 and the routing performance or functionality of access router 44.

To implement a desired functionality for PAD 40 and external processor 42, the service provider (or even a customer or a third party) can define policy rules in the policy database 46 of one or more policy servers 48 (also referred to as a policy decision point (PDP)). Policy server 48 then makes policy decisions that control the functionality and operation of PAD 40 and external processor 42 by reference to the policy rules stored in policy database 46. Policy server 48 communicates policy decisions and associated configuration parameters for external processor 42 and/or PAD 40 to external processor 42 via a Service Policy Interface (SPI) 56, which can be accessed, for example, via an API on policy server 48 and external processor 42. Communication via SPI 56 can employ any of a number of policy query protocols, including Common Open Policy Service (COPS) and Lightweight Directory Access Protocol (LDAP), which are respectively defined by Internet Engineering Task Force (IETF) RFCs 2748 and 2251, which are incorporated herein by reference. External processor 42 relays configuration parameters for PAD 40, if any, to PAD 40 via MCRI 58.

As discussed further below, network access system 31 also permits the service provider (or even a third party) to deploy additional functionality in external processor 42 by developing a service controller to support the functionality and installing the service controller on external processor 42. Additional functionality can also be implemented in network access system 31 utilizing NMS (Network Management System) 72, which is also referred to as an OSS (Operation and Support System). NMS 72 monitors, controls, reports alarms for, and configures (e.g., assigns an IP address to) each of the components of network access system 31 via interfaces 73-77. NMS 72 also preferably includes billing and accounting facilities that allocate costs for services to appropriate customers, for example, in response to messages from the service controllers in external processor 42.

As further illustrated in FIG. 2, network access system 31 of the present invention permits flexibility in the placement and implementation of network switching. For example, an ATM or MPLS (Multi-Protocol Label Switching) network can be utilized to couple one or more PADs 40 to port of an access router 44 through an ATM or MPLS switch 60, thereby permitting signaling and policing functional blocks 62 and 64 to be implemented separately from access router 44. If, however, signaling is implemented by access router 44, switch 60 can be eliminated. Switch 60 can also alternatively be interposed between access router 44 and core router 36 an aggregation switch. Furthermore, access router 44 may be implemented by an external processor 42 running routing software controlling a large PAD 40.

Programmable Access Device (PAD)

Figure 3:
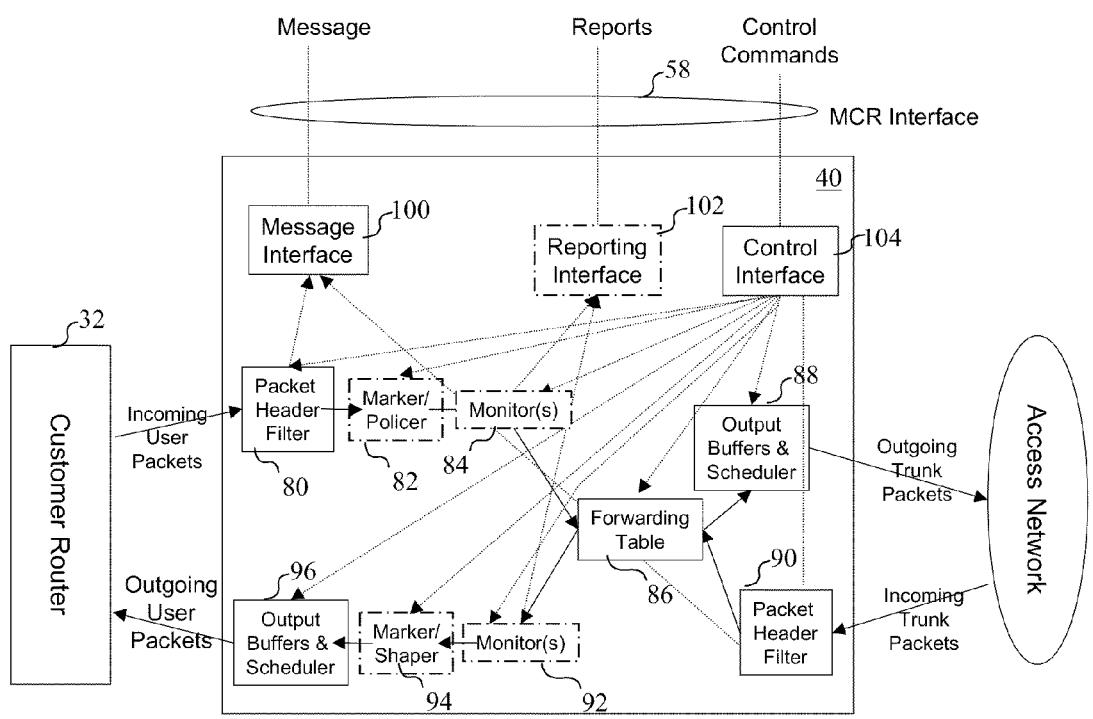
FIG. 3 is a more detailed block diagram of an exemplary embodiment of a programmable access device (PAD) in accordance with the present invention.

Referring now to FIG. 3, there is illustrated a high-level block diagram of the logical elements comprising an exemplary embodiment of a PAD 40 in accordance with the present invention. As noted above, PAD 40 is a programmable access device containing required forwarding and packet classification functions along with other optional traffic conditioning functional modules that implement any desired combination of marking, policing, monitoring, and shaping for incoming and outgoing packets. In a typical embodiment, PAD 40 is implemented as a combination of software and conventional router hardware that cooperate to provide the functionality of the illustrated modules. (In FIG. 3, dashed line illustration is utilized to indicate optional functional modules.)

Generally speaking, the functional modules of PAD 40 are logically arranged in incoming (e.g., from customer router 32) and outgoing (e.g., to customer router 32) traffic paths, with the incoming path including packet header filter 80, marker/policer 82, monitor(s) 84, forwarding table 86, and output buffers and scheduler 88. The outgoing path similarly includes packet header filter 90, forwarding table 86, monitor(s) 92, marker/shaper 94, and output buffers and scheduler 96. The functions of all of these functional modules can be independently configured or programmed by an external processor 42 through MCRI 58.

Incoming packets received from customer router 34 at the external interface of PAD 40 are first processed by packet header filter 80, which distinguishes between various message types using any one or a combination of the protocol type, Source Address (SA), Destination Address (DA), Type Of Service (TOS), Diffsery Codepoint (DSCP), Source Port (SP), Destination Port (DP), and other fields of a packet (e.g., layer 4 and higher layer fields such as the SYN, ACK, RST, and FIN TCP flags) upon which packet header filter 80 is configured to filter. Importantly, in addition to filtering on layer-3 information, packet header filter 80 has the ability to identify higher layer (i.e., layer 4-7) message types or specific fields and forward those messages from/to external processor 42 based on the configured filter parameters. Thus, based upon its filter configuration and the fields of an incoming packet, packet header filter 80 directs the packet either to an external processor 42 via message interface 100 or to a specific marker/policer 82. It should also be noted that message interface 100 may also inject a packet specified by external processor 42 into either of packet header filters 80 and 90.

In response to receipt of a stream of packets from packet header filter 80, marker/policer 82 polices the packet stream by applying one or more token or leaky bucket algorithms to determine whether the packet stream conforms to the traffic parameters established by control interface 104. As a result of the policing function, marker/policer 82 may discard nonconforming packets, mark nonconforming packets (e.g., with a higher or lower priority), and/or count nonconforming packets, depending upon its configuration. If marking is required, marker/policer 82 may set bits in the Differentiated Services (DiffServ)/TOS byte in the IP packet header, and/or the 3-bit MPLS experimental field, and/or the 20-bit MPLS label field, and/or other fields as configured by control interface 104 for that particular packet stream.

Within the incoming path, one or more monitors 84 having different functions may optionally be included. For example, these monitors 84 may include a usage monitor that tracks statistics for different layer-2, layer-3, layer-4, and higher layer traffic types (e.g., to monitor a Service Level Agreement (SLA)). Monitors 84 may also include a fault/troubleshooting/debugging monitor that verifies conformance to standards and assists in code debugging and fault diagnosis by saving and reporting memory dumps and other related information to external processor 42 via reporting interface 102 and MCRI 58. To regulate reporting messages, thresholds and other criteria can be set up to invoke a reporting event. The reporting messages sent to external processor 42 by monitors 84 may summarize usage information for a particular customer, report the occurrence of a high-priority traffic flow, alert external processor 42 to a large volume of out-of-band traffic, report on inactivity of a monitored flow, etc.

After processing by packet header filter 80 (and optionally by marker/policer 82 and monitors 84), incoming packets are processed by forwarding table 86. Forwarding table 86 maintains entries for each forwarding path, where each forwarding path is represented by packet flow attributes, such as DA, SA, TOS, PT, SP, DP, the incoming port, and the corresponding output port to which PAD 40 forwards the packet through the access network toward access router 44. Utilizing these forwarding table entries, forwarding table 86 forwards packets to the appropriate output ports and passes the packets to output buffers and scheduler 88.

Output buffers and scheduler 88 buffer packets ready for transmission over communication network 30 and schedule the transmission of such packets. The buffering within output buffers and scheduler 88, which can comprise a single buffer or preferably multiple buffers, is preferably configured to support multiple QoS classes, or even QoS for each individual flow. For example, a percentage or a fixed amount of buffer space can be assigned to a queue serving a generic class of traffic or a particular traffic flow classified by DA, SA, TOS, PT, SP and/or DP. The packet scheduler then applies weighted round robin and/or other algorithms to the multiple queues multiplexing the different traffic flows. The combination of the buffering and scheduling mechanisms can place a limit on the queuing delay to transmit a packet through PAD 40, thus guaranteeing a bounded value for the QoS jitter parameter for selected traffic flows. Buffers and scheduler 88 can also apply CBQ (Class-based Queuing), WFQ (Weighted Fair Queuing), WRR (Weighted Round Robin) or other link sharing algorithms to optimize communication.

The outgoing path through PAD 40 is similar to the incoming path, except for the inclusion of marker/shaper 94 in lieu of marker/policer 82. As will be appreciated by those skilled in the art, marker/shaper 94 discards nonconforming packets, sends marked packets to appropriate output buffers for the various queues serving different QoS classes for individual flows within output buffers and scheduler 96 to control the delay, jitter and loss of an outgoing packet flow, or simply counts non-conforming packets.

A PAD 40 in accordance with the present invention can be deployed at a number of locations in a network to perform traffic management and policy control. For example, a PAD 40 can be placed in a customer access network (e.g., fiber, xDSL, cable modem, WAP (Wireless Access Protocol), etc.) connecting customer equipment to a provider network controlled by regionally located external processors 42. Alternatively, a PAD 40 can be deployed at a service provider's Point of Presence (POP), interfacing with a customer site over a private line, FR, ATM, MPLS or Ethernet access network. A PAD 40 in accordance with the present invention can also be located facing a server farm that can be in the provider's POP or in a customer's site. The manner in which such a distributed network of PADs 40 forwards packets to access router 44 is configured in forwarding table 86 by an external processor 42 using control interface 104.

External Processor

Figure 4:
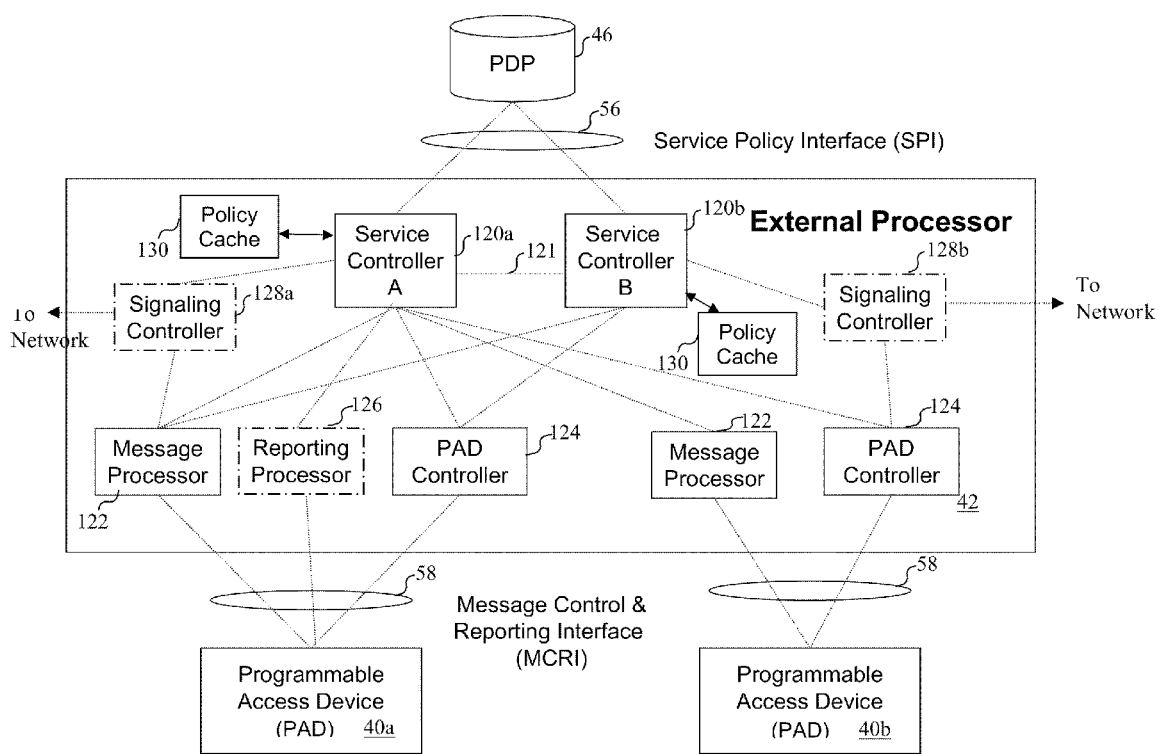
FIG. 4 is a more detailed block diagram of an exemplary embodiment of an external processor in accordance with the present invention.

With reference now to FIG. 4, there is illustrated a high-level block diagram depicting the logical elements comprising a preferred embodiment of an external processor 42 in accordance with the present invention. External processor 42 can be implemented utilizing either or both of software and hardware, which hardware can include general purpose computing hardware or special purpose hardware. Although software-only implementations of external processor 42 that execute on the hardware of a PAD 40 are possible, external processor 42 is preferably implemented with stand-alone hardware to allow the service processing performed by external processor 42 to be easily scaled by the installation of additional and/or higher performance external processor hardware. Separation of external processor 42 from the forwarding function performed by PAD 40 also allows dynamic allocation of processing resources within external processor 42 in response to access traffic patterns without degrading the forwarding performance of PAD 40. Moreover, as shown in FIG. 4, implementing external processor 42 separately from PAD 40 permits an external processor 42 to service multiple PADs 40a and 40b (which may be located at physically distant locations) or, alternatively, permits multiple external processors 42 to service a single PAD 40. The association of a single PAD 40 with multiple external processors 42 provides enhanced fault tolerance.

In a preferred embodiment, external processor 42 primarily performs three types of processing: invoking policy services, signaling to setup and teardown access network connections, and configuring one or more associated PADs 40. To coordinate these different processing functions, external processor 42 contains one or more service controllers 120, which each preferably controls these three functions for a respective type of service. For example, service controllers 120 may include any or all of a Conference Call Service Controller (CCSC), an E-Commerce Service Controller (ECSC), an IP Telephony Service Controller (IPTELSC), a Reserved Bandwidth Service Controller (RBSC), and a Multicast Service Controller (MSC). Such service-specific control can be implemented either with dedicated service controllers or with generic controllers that each support service-specific APIs. Each service controller preferably maintains a session table recording all of its active sessions with a PAD 40.

As further shown in FIG. 4, external processor 42 includes, for each associated PAD 40, a respective PAD controller 124. Under the direction of service controller(s) 120, each PAD controller 124 configures forwarding table 86, packet header filters 80 and 90, marker/policer 82, marker/shaper 94, monitors 84 and 92, and output buffers and schedulers 88 and 96 of the associated PAD 40 by invoking commands or scripts understood by control interface 104. External processor 42 also contains a respective message processor 122 for each associated PAD 40. Message processors 122 each communicate messages to and from the message interface 100 of the associated PAD 40. Upon receipt of a message from a PAD 40, which is usually a message received from the customer router 32, a message processor 122 parses the message and informs the appropriate service controller (as determined by the type of service) of its contents. As indicated in FIG. 4, at any given time not all PADs 40 may be configured to handle all service types; thus, a particular service controller 120 may communicate messages with less than all PADs 40.

As indicated by dashed line illustration, external processor 42 may further include a reporting processor 126 for each PAD (e.g., PAD 40a) containing optional monitors 84 or 92 and reporting interface 102. Reporting processor 126 receives report messages from the corresponding PAD's reporting interface 102 and transmits appropriate report messages to one or more service controllers 120. Reporting processor 126 can also configure the reporting interface 102 of a PAD 40 to specify acceptable type(s) of reporting messages, content of reporting messages, reporting events, etc.

Upon receipt of a report message from reporting processor 126 or another message type from a message processor 122, a service controller 120 translates the message into one or more policy queries and transmits the policy query or queries to policy server 48 via SPI 56. For example, if SPI 56 employs COPS, a service controller 120 will translate RSVP and SIP messages to COPS (RSVP) and COPS (SIP) messages, respectively. A service controller 120 may also pass a message to another service controller 120 to obtain additional services via interface 121.

In response to receipt of a policy decision from policy server 48, service controller 120 may inject one or more packets into a traffic flow via message processor 122, configure a PAD 40 via PAD controller 124 or control signaling inside or outside communication network 30 via signaling controllers 128a and 128b. Signaling controllers 128 support signaling protocols (e.g., RSVP, Label Distribution Protocol (LDP), Private Network-Network Interface (PNNI), frame relay or ATM User Network Interface (UNI), etc.) to setup or tear down a Virtual Connection (VC) or Label Switched Path (LSP) across the network. A VC or LSP setup by a signaling controller 128 may have a specified QoS.

To reduce the number of messages passed between service controllers 120 and policy server 48 via SPI 56, service controllers 120 each preferably cache frequently used policy rules in a respective policy cache 130. Accordingly, if policy information for a policy query arising from an incoming message is already cached, a service controller 120 can forego sending a query to the policy server 48 and make a policy decision by reference policy rules cached in its policy cache 130. In addition, when a service controller 120 queries policy server 48 with a new service request, the service controller 120 may request policy server 48 to dump all the related policy information from policy database 46 to its policy cache 130. However, there is a tradeoff between the number of policy queries and the cache refresh frequency and the amount of policy information downloaded from policy server 48 at each refresh. The objective is to cache policies for IP services requiring intensive policy queries, such as SIP calls, while avoiding caching policy lookups for other sessions (e.g., TCP sessions) that generally generate only one policy query in their lifetime.

Network Access System Interfaces

As described above, the network access system of the present invention supports at least two interfaces: SPI 56 and MCRI 58. Each of these interfaces is examined in turn infra.

As summarized in Table I below, SPI 56 preferably supports at least one message type that is sent from the service controllers 120 of external processor 42 to policy server 48, namely, queries regarding policy requirements. Such policy queries preferably include a flag that can be set to request that policy server 48 dump the policy rules for the query into the policy cache 130 of the requesting service controller 120.

SPI 56 also preferably supports at least five message types that are sent from policy server 48 to service controllers 120. The message types sent via SPI 56 from policy server 48 to service controllers 120, which are also summarized in Table I, include transaction approval and rejection messages, messages specifying configuration parameters, and messages containing policy information to be cached in policy caches 130. In addition, policy server 48 can send messages to external processor 42 that indicate settings for session level parameters in PAD 40. As understood by those skilled in the art, one important session level parameter is an inactivity timer that counts time that has elapsed since a packet has been received in an active session and, if more than a specified amount of time has elapsed, signal that the session should be closed for lack of activity.

TABLE I

| Service Controller to Policy Server | Query policy requirements with or without request to cache policy information |
|---|---|
| Policy Server to Service Controller | Approve transaction<br>Reject transaction with a cause indication<br>Provide configuration parameters<br>Dump the policy information into policy caches<br>Set session level parameters |

Communication between policy server 48 and external processor 42 over SPI 56 can be either solicited or unsolicited. In the unsolicited mode operation, policy server 48 sends configuration parameters for external processor 42 and PAD 40 to external processor 42 in the absence of a policy request. Alternatively, in the solicited mode of communication, policy server 48 sends policy decisions and configuration parameters to external processor 42 in response to a policy request. As shown in FIG. 2, policy requests can either be sent by external processor 42 or, because SPI 56 preferably employs an open policy query protocol, by a third party's (e.g., a customer's policy server). In either case, policy server 48 receives a policy request via SPI 56. The policy request typically specifies a requested service and requires a response indicating whether the requested service is to be provided given the parameters of the service (e.g., identity of the requestor, type and amount of service requested, etc.), and if so, the appropriate configurations for the service. In response to receipt of a policy request, policy server 48 interrogates policy database 46 to access the appropriate policy rules given the parameters provided in the policy request. Policy server 48 then makes policy decisions for the policy request utilizing the accessed policy rules and usage information. For example, policy server 48 may track the amount of bandwidth reserved by a particular customer (a policy rule) and approve or reject a new service request by comparing the amount of remaining reserved bandwidth that is unutilized (usage information) and the amount of bandwidth required to provide the requested service. Policy server 48 then supplies the resulting policy decisions, which can be "approve," "reject," and/or configuration of session level parameters for external processor 42 and PAD 40, to external processor 42 via SPI 56.

Turning now to MCRI interface 58, Table II, below, summarizes message types that are sent by PAD 40 to external processor 42. As indicated, these message types can be conveniently categorized by reference to which of message interface 100, reporting interface 102, and control interface 104 is the source of the messages.

As noted above, message interface 100 of PAD 40 passes messages captured by packet header filters 80 and 90 to message processor 122 of external processor 42. The messages that are passed to message processor 122 can be filtered out of the incoming or outgoing packet flows based upon SA, DA, PT, SP, DP and/or other packets fields such as TCP flags (e.g., SYN, ACK, RST, FIN, etc.), as well as layer 4-7 message types and fields.

Control interface 104 sends control reply messages to PAD controller 124 in response to receipt of a control command message. If the command completes successfully (e.g., a configuration of a monitor 84 is successfully updated), control interface 104 returns a command acknowledgement to PAD controller 124. However, if a command cannot be completed due to improper syntax, unavailability of required resources, etc., then control interface 104 notifies PAD controller 124 of the command failure with a command failure indication.

Reporting interface 102 of PAD 40 sends reporting messages to reporting processor 126 of external processor 42. The reporting messages tabulated in Table II include messages providing information about monitored sessions, messages related to communication between PAD 40 and service controllers 120 of external processor 42, and messages containing statistics collected by monitors 84 and 92. For certain protocols, such as TCP and SIP, PAD 40 implements a state machine for each active session. If a TCP state machine detects that a particular active TCP session has had a number of retransmissions in excess of an established retransmission threshold, reporting interface 102 sends a message notifying message processor 122 of external processor 42 that the TCP retransmission threshold has been exceeded, thus indicating that the TCP session has failed. Reporting processor 126 similarly reports other session failures such as the expiration of an inactivity timer on certain IP protocol sessions, such as TCP and SIP. For other data flows (e.g., UDP sessions) that do not have associated state machines to ensure reliability, reporting interface 102 of PAD 40 sends "Activity Detected" reporting messages when activity is detected in the session.

In the preferred embodiment of the present invention represented by Table II, the connection state between a PAD 40 and external processor 42 is indicated by keepalive messages that are periodically exchanged between each PAD 40 and the associated external processor 42. The absence of a keepalive message from a PAD 40 indicates the failure of the connection between the PAD 40 and external processor 42 and/or the failure of PAD 40 itself. Such keepalive messages are preferably transmitted between reporting interface 102 and reporting processor 126; however, if no reporting interface is implemented, keepalive messaging can alternatively be provided by message interface 100.

Service controllers 120 within external processor 42 are also subject to failure or dynamic reallocation to different services (e.g., for load balancing reasons). In the event of a failure of an external processor 42 supporting multiple service controllers 120 or a redistribution of service responsibility between service controllers 120, the new service controller 120 to which responsibility for a session is transferred must receive state information pertaining to all of the active sessions of the old service controller 120. Accordingly, in the event of a so-called switchover that assigns a PAD 40 to a preferred external processor 42, PAD 40 preferably reports the state information for active sessions to reporting processor 126 of external processor 120 in a state synchronization message. Making PAD 40 responsible to provide session state information to the new service controller 120 in this manner advantageously relieves service controllers 120a and 120b from the responsibility of synchronizing session states, which is a message-intensive process that degrades service controller performance during normal operation. This aspect of the design achieves fault tolerance to hardware, software, and network failures.

Table II finally lists two exemplary reporting messages triggered by the monitoring performed by optional monitors 84 and 92. First, reporting interface 102 can provide general usage statistics on a per-customer basis. Service controllers 120 in external processor 42 can utilize this statistical information to measure conformance to SLAs and detect certain events of interest. Second, reporting interface 102 can specifically indicate in a reporting message that a customer's predefined traffic threshold has been exceeded. A service controller 120 in external processor 42 can utilize this information to allocate additional resources to the customer's traffic (e.g., to ensure conformance to a SLA) or can notify billing server 72 that an adjustment should be made in customer billing (e.g., if billing is based upon usage). Of course, additional reporting messages can also be defined.

TABLE II

| Message | Filtered messages |
|---|---|
| Control | Command acknowledgement |
| | Command failure indication |
| Reporting | TCP retransmit threshold exceeded |
| | TCP state memory full |
| | Inactivity timer expired |
| | Activity detected |
| | Keepalive exchange |
| | State synchronization in event of a service controller switchover |
| | Traffic threshold exceeded |
| | Usage statistics |

Referring now to Table III, messages types sent to PAD 40 from message processor 122, PAD controller 124, and reporting processor 126 of external processor 42 via MCRI 58 are summarized. In the interface embodiment shown in Table III, message processor 122 can send at least two types of messages to message interface 100. First, message processor 122 may send message interface 100 one or more packets to be injected into either the incoming or outgoing packet flow. Second, message processor 122 may send message interface 100 a message indicating packet field flags in message interface 100 to be set or reset to cause message interface 100 to pass or to prevent message interface 100 from passing particular messages to message processor 122 based upon the contents of various packet fields, such as SA, DA, PT, SP, DP, etc.

As set forth in Table III, the control messages sent from PAD controller 124 to control interface 104 via MCRI 58 include a number of configuration messages that enable a PAD controller 124 to configure any of the filtering, marking, policing, monitoring, buffering, scheduling, shaping and forwarding functional modules 80-96 of PAD 40 through control interface 104. In particular, output buffers and schedulers 88 and 96 can be configured to allocate a number of buffers or size of buffer per traffic class or traffic flow or to implement CBQ, WFQ, WRR or other buffer scheduling algorithms. PAD controller 124 can also configure marker/shaper 94 to employ static or adaptive shaping algorithms and can configure marker/shaper 94 to implement shaping on a per traffic flow or per traffic class basis. PAD controller 124 can further configure forwarding table 86 in response to a request by a service controller 120 in order to enable the service controller 120 to associate a data flow with an ATM SVC or a MPLS LSP.

In addition to general control messages utilized to configure functional modules 80-96, MCRI 58 also supports various control messages utilized to configure particular features of the functional modules of PAD 40. For example, packet header filters 80 and 90 can be configured to drop multicast packets from an unauthorized source, to admit or deny source routing for a data flow, or to admit only packets with specific source addresses. In addition, PAD controller 124 can update forwarding table 86 with SVC and LSP paths setup by a service controller 120 using a signaling controller 128. Reporting interface 102 can be configured via a "Set reporting flags" control message to enable or disable reporting of selected events by setting or resetting reporting flags corresponding to these events. PAD 40 can also be configured via MCRI control messages to set the TCP retransmission notification threshold, inactivity timers, activity timers and traffic threshold discussed above. Finally, the processing resources of PAD 40 and output buffers and scheduler 88, 96 can be configured by an "Allocate Resource" control message sent via MCRI 58 and control interface 104 to dynamically allocate resources, such as bandwidth, queues, and processing time slices, to a customer interface, a packet flow, a class, or a multicast group.

The reporting messages sent from reporting processor 126 of external processor 42 to PAD 40 are generally limited to exchanging keepalive messages with reporting interface 102. The continued exchange of keepalive messages informs PAD 40 that the associated service controller 120 is operative. If PAD 40 fails to receive keepalive messages from a service controller 120, PAD 40 initiates a switchover of service to a secondary service controller 120, as discussed further below.

TABLE III

| Message | Inject packet into ingress or egress packet flow |
|---|---|
| | Set pass/no pass flag of message interface |
| Control | Configure packet header filter |
| | Configure marker |
| | Configure policer |
| | Configure forwarding table |
| | Configure output buffers and scheduler |
| | Configure shaper |
| | Drop multicast packets from specified source |
| | Admit/deny source routing option |
| | Set TCP retransmission threshold |
| | Set session inactivity timer |
| | Set activity timer and level |
| | Set traffic reporting threshold |
| | Allocate resource |
| | Set reporting flags |
| | Set SVC, PVC or LSP |
| | Delete TCP session |
| Reporting | Keepalive exchange |

Fault Tolerance

To prevent an interruption in service in the event of a service controller failure, each service is preferably supported by both a primary service controller that ordinarily provides the service and a secondary service controller that can provide the service if the primary service controller fails or if the connection between a PAD and the primary service controller is lost. In a preferred embodiment of the present invention, the primary and secondary service controllers reside on separate external processors 42 diversely connected via the access network. In response to detecting failure of communication with the primary service controller, PAD 40 performs a switchover to the secondary service controller.

Referring now to FIG. 5A, there is depicted a time-space diagram showing exemplary network access system signal to switchover the provision of service from a failed primary service controller to a secondary service controller in accordance with the present invention. In FIG. 5A, it is assumed for the purpose of illustration that service controller 120a is the primary service controller and service controller 120b is the secondary service controller.

During normal operation, a PAD 40 employs a reliable communication protocol (e.g., TCP) to exchange information with service controllers 120a and 120b of the associated external processor 42. As noted above, a keepalive message is periodically exchanged between external processor 42 and PAD 40 to keep the TCP session active. When PAD 40 detects a timeout of the keepalive message, meaning that the connection to primary service processor 120a has failed, PAD 40 attempts to set up a TCP session with secondary service controller 120*b*, as shown in FIG. 5A by PAD 40 sending a synchronizing segment (SYN) to secondary service controller 120*b*. If PAD 40 is unsuccessful in connecting with secondary service controller 120*b* (e.g., no SYN ACK is received from the secondary service controller 120), PAD 40 stops accepting new sessions and maintains the state and service for all currently active sessions until communication with primary service controller 120*a* is restored.

If, however, PAD 40 successfully established a TCP session with secondary service controller 120*b* (e.g., as indicated by receipt of a SYN ACK and return of an ACK), PAD 40, which maintains a state machine for each active session, uploads state information for all of its active sessions controlled by failed primary service controller 120*a* to secondary service controller 120*b*. Once receipt of the state information by secondary service controller 120*b* is acknowledged by an ACK message, PAD 40 initiates the exchange of keepalive messages with secondary service controller 120*b*. Thus, service is not interrupted by the failure of a single service controller 120, and no synchronization is required between service controllers 120*a* and 120*b*.

Communication between PAD 40 and secondary service controller 120*b* may continue and not revert to primary service controller 120*a* if a non-reverting behavior is desired. However, it is presently preferred for communication to revert to primary service controller 120*a*, if possible, to maintain load balancing of service controller processing across the distributed PADs.

Figure 5B:
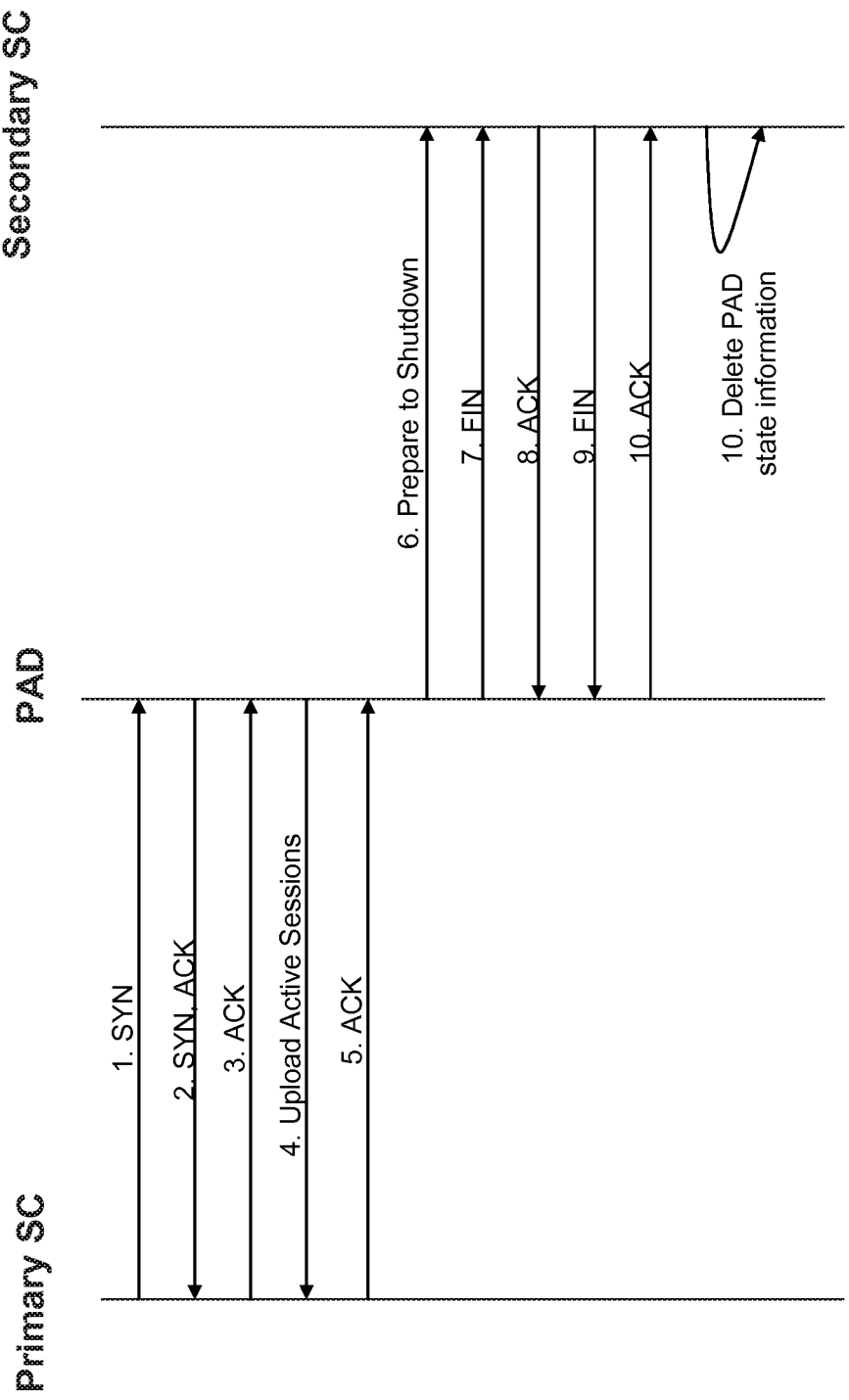
FIG. 5B depicts exemplary signaling between a programmable access device and an external processor during a switchover from a secondary service controller to a primary service controller following restoration of the primary service controller.

Referring now to FIG. 5B, there is depicted a time-space diagram showing exemplary signaling between a programmable access device and an external processor during a switchover from a secondary service controller to a primary service controller following restoration of the primary service controller. The reversion process begins with primary service controller 120*a* sending a SYN segment to PAD 40 to reestablish a TCP session. PAD 40 responds to receipt of the SYN with a SYN ACK, which primary service controller 120*a* confirms with an ACK. Once a TCP session has been initiated, PAD 40 uploads the states of active sessions to primary service controller 120*a*, and service controller 120*a* confirms receipt of the session states with an ACK.

After the session states have been successfully restored to primary service controller 120*a*, PAD 40 notifies secondary service controller 120*b* that primary service controller 120*a* has been restored via a "Prepare to shutdown" message. PAD 40 then closes the TCP session with secondary service controller 120*b* via a pair of FIN (i.e., finished) and ACK handshakes, the first half of which is originated by PAD 40 and the second half of which is originated by secondary service controller 120*b*. After the TCP connection is closed, secondary service controller 120*b* deletes all the state information related to the sessions transferred to primary service controller 120*a*. PAD 40 thereafter resumes keepalive exchanges with primary service controller 120*a*.

Metropolitan Implementation

With reference now to FIG. 1B, there is depicted an exemplary metropolitan implementation of an Internet Service Provider (ISP) network including a distributed network access system in accordance with the present invention. FIG. 1B illustrates physical interconnections of components, rather than logical (e.g., network) connections, as shown in FIG. 2.

Starting from the left hand side, customer LANs 14 interconnect either to a lowest level access network (e.g., TDM, ATM, or Ethernet) among metropolitan access networks 16' or directly to a PAD 40. As shown, PADs 40 may also be located at higher levels in the aggregation network hierarchy. Engineering economic and/or performance considerations determine placement of PADs 40. For example, aggregation of a minimum amount of traffic or the need to access a low speed access link may drive placement of a PAD 40 to higher and lower access network levels, respectively.

As discussed above, PADs 40 perform policy enforcement, thus relieving the aggregation routers (i.e., access routers 44) of some workload. Policy determination is also removed from the aggregation routers and is instead located in redundant external processors 42 and PDPs 46. For most implementations, external processors 42 would typically be deployed in a distributed manner to each metropolitan area, while PDPs 46 would be deployed more sparsely on a regional basis. As a result of relieving some of the workload of aggregation routers, access routers 44 can be scaled to handle larger traffic capacities because they are optimized to handle the simpler, yet essential, task of Internet routing. The capabilities of the ISP network are also expanded because PADs 40, external processors 42, and PDPs 46 implement not only the functionality of state-of-the-art edge routers, but also a number of functions not currently available in monolithic router designs.

In order to further illustrate aspects of the present invention, examples of network access system signaling and messaging for various operating scenarios are described below with reference to generic space-time drawings. The examples illustrate exemplary implementations of network-level signaling, connection-oriented and connectionless transport protocols, application-level communication, and policy-based multicast service management.

Network-Level Signaling Example

Figure 6:
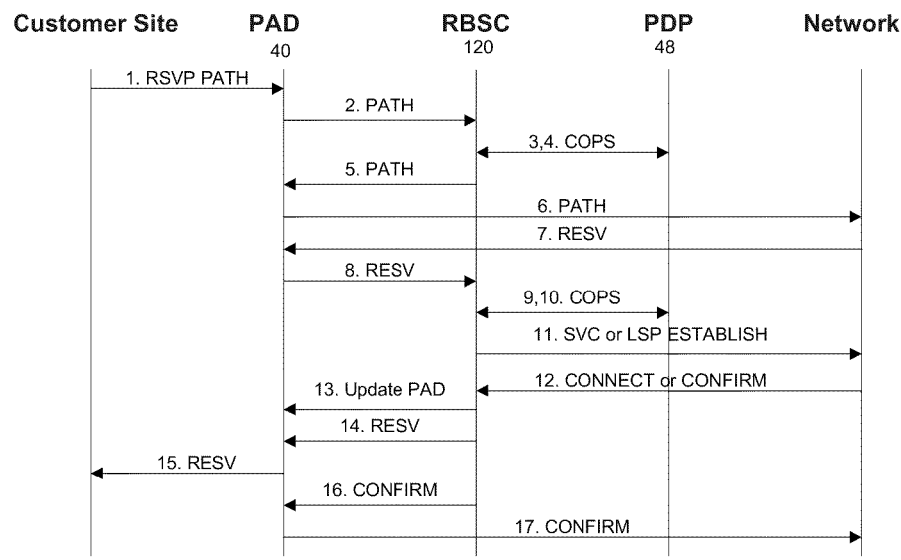
FIG. 6 illustrates exemplary signaling in a network access system in accordance with the present invention to support service reservation utilizing Resource Reservation Protocol (RSVP)

With reference now to FIG. 6, there is illustrated a time-space diagram depicting exemplary network-level signaling utilized to obtain a service reservation through the use of the Resource Reservation Protocol (RSVP). In the illustrated example, a customer application initiates the reservation process by sending a RSVP PATH message to PAD 40. For example, the customer application may request a path of specified bandwidth at a particular time. As shown in FIG. 6, packet header filter 80 of PAD 40 captures the RSVP PATH message based upon RSVP protocol type (i.e., PT=46) and forwards it to the appropriate service controller 120 (which in this example is referred to as a Reserved Bandwidth Service Controller (RBSC)) 120 within external processor 40.

In response to receipt of the path message, RBSC 120 transmits an appropriate policy query to policy server 48 via SPI 56 (which in this case is assumed to implement COPS) to determine whether the reservation service is authorized for this customer. If policy server 48 returns a policy decision to RBSC 120 approving the reservation service for this customer, RBSC 120 returns a RSVP PATH message to PAD 40, which sends the PATH message downstream to the egress point of the network.

If the receiver at the far end of the network also approves the reservation, the receiver responds by transmitting a reservation (RESV) message to PAD 40, which passes the RESV message to RBSC 120. In response to the RESV message, RBSC 120 invokes another policy query to policy server 48 to ascertain whether the bandwidth requirements specified by the RESV message are authorized for this customer. In response to this second query, policy server 48, which tracks allocated bandwidth for each customer, determines whether the currently allocated bandwidth plus the requested bandwidth is less than the maximum authorized bandwidth for this customer. If so, policy server 48 notifies RBSC 120 with a policy decision indicating approval. RBSC 120 then initiates appropriate ATM or MPLS signaling to set up a RVC or LSP utilizing one more signaling controllers 128. After RBSC 120 receives confirmation of the requested path from the network, RBSC 120 configures packet header filter 80 and forwarding table 86 of PAD 40 to transmit packets in the customer's flow over the established SVC or LSP. In addition, RBSC 120 returns the RESV message to PAD 40 using message interface 100, which sends the RESV message upstream to the customer application. RBSC 120 also sends a CONFIRM message downstream to the receiver via PAD 40 to complete the handshake utilized to set up the SVC or LSP.

Connection-Oriented Transport Examples

Figure 7A:
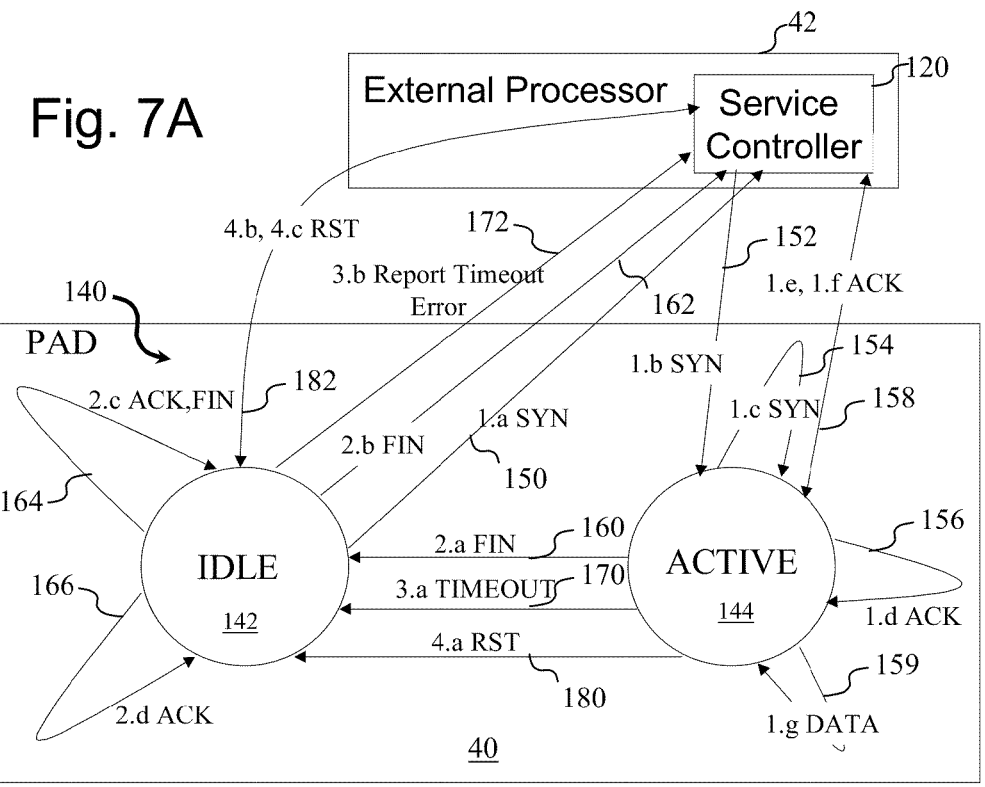
FIG. 7A is a state machine diagram illustrating the operation of an exemplary programmable access device during a TCP session.

With reference now to FIGS. 7A-7G, there are depicted a TCP state machine and time-space diagrams of various TCP events that together illustrate the handling of connection-oriented transport protocols by a network access system in accordance with the present invention. Referring first to FIG. 7A, a preferred embodiment of a state machine maintained for a TCP session on a PAD 40 is depicted. As shown, TCP state machine 140 includes two states: an idle state 142 in which there is no active TCP session and an active state 144 in which there is an active TCP session. The operation of state machine 140 maintains TCP session state during four TCP processes, including (1) opening a TCP session in response to a synchronizing segment (SYN), (2) closing a TCP session in response to a finished (FIN) message, (3) closing a TCP session that has timed out and (3) closing a TCP session in response to a reset (RST) message. In FIG. 7A, messages associated with each of these operations are identified by corresponding legends (e.g., "1.x" for a TCP session open, "2.x" for a TCP session close in response to a FIN message, etc.) and are further time-ordered by alphabetic designations (e.g., "1.a" precedes "1.b," etc.).

As illustrated, opening of a TCP session is initiated when state machine 140 is in idle state 142 and PAD 40 receives a SYN segment. As illustrated at reference numeral 150, packet header filter 80 captures the initial SYN message received from the customer and passes it to the service controller 120 within external processor 42 that is designated to handle TCP services. In response to receipt of SYN message, service controller 120 queries policy server 48 regarding a TCP session for this customer. If service controller 120 receives a policy decision indicating approval of the TCP session, service controller 120 returns the SYN segment to PAD 40 as indicated at reference numeral 152. In response to receipt of SYN message from service controller 120, state machine 140 changes state from idle state 142 to active state 144. PAD 40 forwards the SYN segment to the receiver specified by the destination address and receives a SYN, ACK segment from the receiver, as shown at reference number 154. The sender completes the three-way handshake required to open the TCP session by replying with an ACK message, as depicted at reference numeral 156. PAD 40 passes the ACK message representing the success of the handshake to service controller 120, as shown at reference numeral 158. Receipt of the ACK message notifies service controller 120 that the TCP session is open and causes service controller 120 to add the TCP session to its active session table. Service controller 120 then sets an inactivity timer and other parameters of this TCP session in PAD 40 and returns the ACK message to PAD 40, as also indicated at reference numeral 158. Thereafter, data can be transmitted between the customer and the receiver via the active TCP session, as shown at reference numeral 159.

To close an active TCP session, either the customer or receiver can send PAD 40 a FIN message. In response to receipt of the FIN message, PAD 40 resets TCP state machine 140 to idle state 142 as shown at reference numeral 160. PAD 40 than passes the FIN message to service controller 120 as shown at reference numeral 162. The FIN message notifies service controller 120 that the TCP connection is inactive and causes service controller 120 to delete the TCP session from its active session table. As illustrated, PAD 40 forwards the FIN message to its destination (i.e., either the customer or receiver), which responds with an ACK message and a FIN message 164. The source then responds the last FIN message with an ACK message 166. In response to receipt of the last ACK message, PAD 40 deletes the state machine 140 for the TCP session.

As further illustrated in FIG. 7A, PAD 40 will also close an active TCP session if the inactivity timer for the TCP session expires. In response to expiration of the inactivity timer for an active TCP session, PAD 40 transitions state machine 140 from active state 144 to idle state 142, as illustrated at reference numeral 170. PAD 40 also reports a timeout error to service controller 120, as shown at reference numeral 172. In response to receipt of the timeout error message, service controller 120 deletes the TCP session from its active session table and updates the configuration of PAD 40 to remove the inactivity timer and other configuration information associated with the TCP session. PAD 40 then deletes the state machine 140 for the TCP session.

PAD 40 also closes an active TCP session in response to receiving a reset (RST) message from either party to a TCP connection. In response to receipt of the RST message, PAD 40 transitions state machine 140 from active state 144 to idle state 142, as shown at reference numeral 180. PAD 40 also passes the RST message to service controller 120, as shown at reference numeral 182. In response to receipt of the RST message, service controller 120 passes the RST message back to PAD 40 to acknowledge receipt of RST and successful deletion of the TCP session, as also shown at reference numeral 182. PAD 40 then deletes the state machine 140 of the TCP session and forwards the RST message to the other party of the TCP session.

In order to promote efficient operation of PAD 40 and service controller 120, it is desirable to minimize the amount of messaging there between. Accordingly, PAD 40 only forwards the last ACK messages to service controller 120 if required to open a TCP session. In addition, PAD 40 only passes the first SYN, FIN segment received in a session to service controller 120. In this manner, excessive messaging is avoided, even though the functions of PAD 40 and service controller 120 are distributed.

In the preferred embodiment, PAD 40 needs only keep active state information for TCP session for which service controller 120 configures value-added services. In other words, PAD 40 will not keep state information for best-effort TCP sessions. This greatly reduces the required memory size on PAD 40 for keeping TCP state information (e.g., state variables for packet header filters 80 and 90 and monitors 84 and 92). Also, since there may be a large number of active TCP sessions, the delete TCP session message given in Table III allows service controller 120 to decide which TCP sessions will receive value-added service in the event that TCP session state memory is full.

Figure 7B:
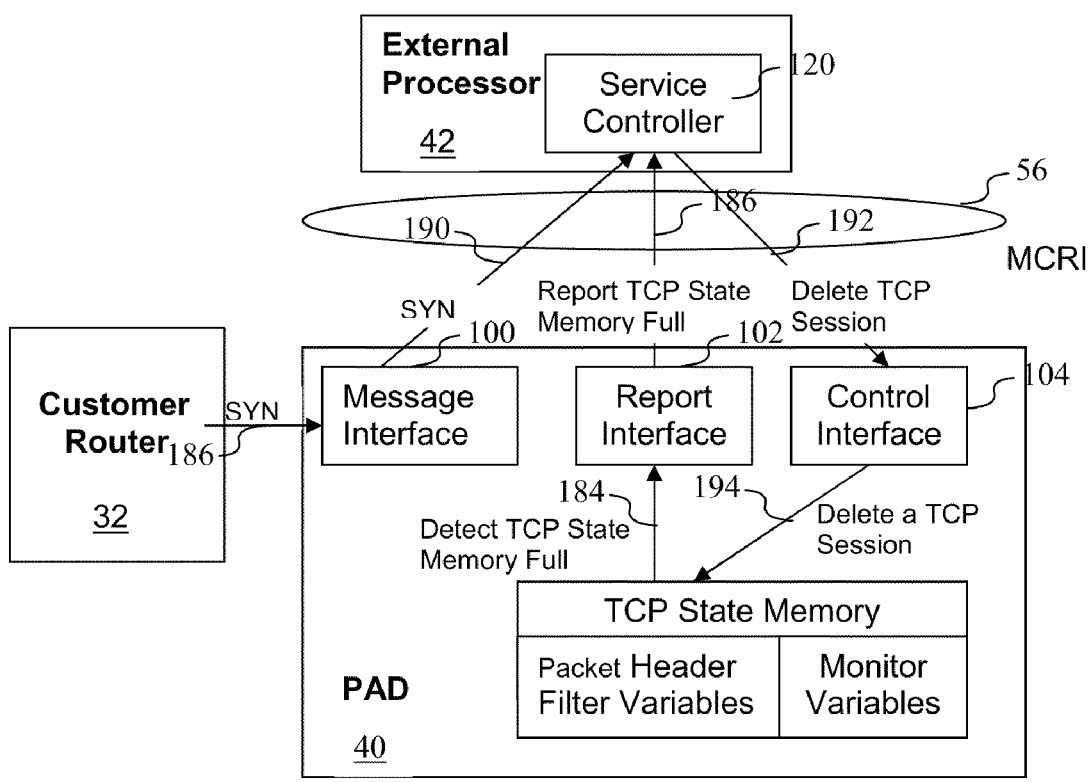
FIG. 7B is a diagram illustrating the operation of an exemplary programmable access device and associated service controller in the event of a TCP state memory full condition.

As illustrated in FIG. 7B, PAD 40 sends a TCP state memory full message 186 to service controller 120 through the reporting interface 102 in response to detecting a TCP state memory full event 184. State memory full event 184 may result from depletion either of storage for packet header filter state variables or of storage for monitor state variables. In response to receipt of TCP state memory full message 186, service controller 120 records the TCP state memory status of PAD 40.

When customer router 32 initiates another value-added TCP session by sending a SYN message 188, PAD 40 passes the SYN message to service controller 120 through the message interface 100, as shown at reference numeral 190. In response to receipt of the SYN message, service controller 120 checks the TCP state memory status of PAD 40. Since the TCP state memory status is full, service controller 120 decides whether or not to allow the new TCP session to overwrite existing value-added TCP sessions based on some pre-installed policies. For example, service controller 120 may assign each value-added service a priority and allow sessions of higher relative priority to overwrite lower priority TCP sessions. Alternatively or in addition, service controller 120 may permit the new TCP session to overwrite the TCP session having the longest period of inactivity.

If the new TCP session is not allowed to overwrite any existing TCP session, service controller 120 ignores the SYN message. As a result, PAD 40 does not install any state information for the new TCP session, and PAD 40 provides best-effort service to the new TCP session. If, however, service controller 120 decides that the new TCP session can overwrite another TCP session, service controller 120 sends a Delete TCP session message 192 to PAD 40 through control interface 102. PAD 40 responds by deleting an existing TCP session from its TCP state memory, as indicated at reference numeral 194. The process illustrated in FIG. 7A at reference numerals 150-159 is then performed to install the new TCP session in the state memory of PAD 40.

Figure 7C:
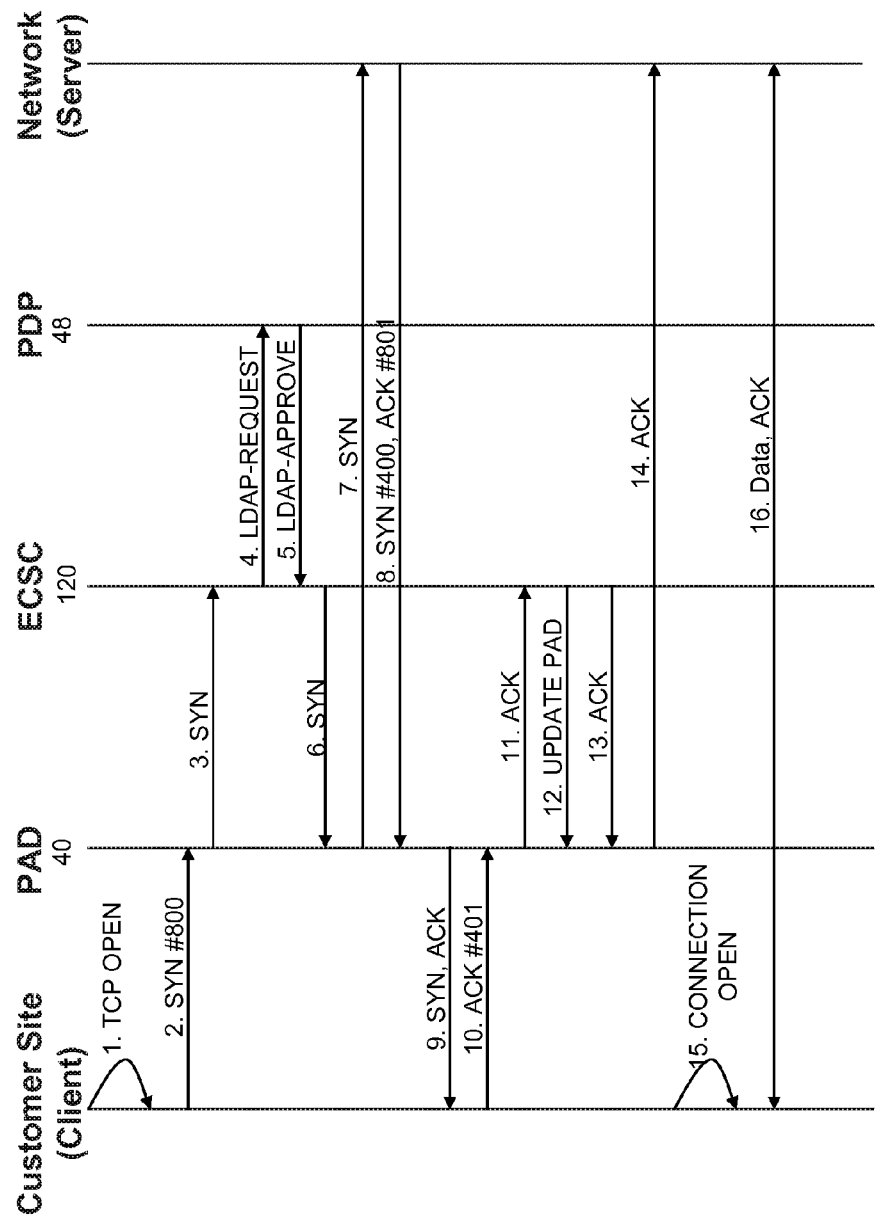
FIG. 7C depicts exemplary signaling in a network access system in accordance with the present invention during TCP session establishment.

Given the exemplary TCP state machine depicted in FIG. 7A, several examples of TCP signaling will now be described with reference to FIGS. 7C-7G. Referring first to FIG. 7C, exemplary signaling utilized to establish a TCP session through a network access system in accordance with the present invention is shown.

As illustrated, to open a TCP session, a client application first issues an open command that informs the protocol stack that the application desires to open a connection to a server at a specified port and IP address (e.g., when accessing a web page). The TCP agent at the client site then selects an initial sequence number (800 in this example) and transmits a synchronizing segment (SYN) carrying the selected sequence number. When the SYN segment arrives, packet header filter 80 in PAD 40 detects, based upon the specified destination IP address and port number (PT=6, Port=80), that the SYN segment is intended to initiate a mission-critical e-commerce TCP session. Accordingly, packet header filter 80 passes the SYN segment to an e-commerce service controller (ECSC) 120. ECSC 120 responds to the SYN segment by querying policy server 48, for example, utilizing an LDAP request.

In response to policy server 48 indicating approval of the TCP session, for example, via an LDAP APPROVE message, ECSC 120 returns the SYN segment to PAD 40. When PAD 40 receives the SYN segment from ECSC 120, PAD 40 spawns a new TCP state machine and sets it to active state 144. PAD 40 then sends the SYN segment downstream to the server specified in the SYN segment.

When the SYN segment is received at the server, the server's TCP agent picks an initial sequence number (400 in this case) and sends a SYN segment containing the selected initial sequence number and an ACK to PAD 40. The ACK message specifies that the first data byte sent by the client should be numbered 801. It should be noted that while the SYN and ACK messages sent by the server are forwarded by PAD 40 to the customer application, these messages need not be forwarded to ECSC 120.

When the TCP agent at the client receives the SYN/ACK message, the TCP agent returns an ACK message of 401, meaning that the first data byte sent by the server should be numbered 401. This ACK message is passed by PAD 40 to ECSC 120 to notify ECSC 120 that the three-way handshake is successful and the TCP session is open. ECSC 120 then adds the TCP session into its active session table and configures PAD 40 with an allowed number of TCP retransmissions and appropriate inactivity timer setting. ECSC 120 may also set marker/policer 82 to mark packets belonging to this TCP session as high priority. ECSC 120 then returns the ACK segment to PAD 40, which sends the ACK segment to the destination server to inform the receiver that the TCP session is open. Once the customer's TCP agent informs the client application that the TCP connection is open, the client and server can begin exchanging data in the TCP session.

Figure 7D:
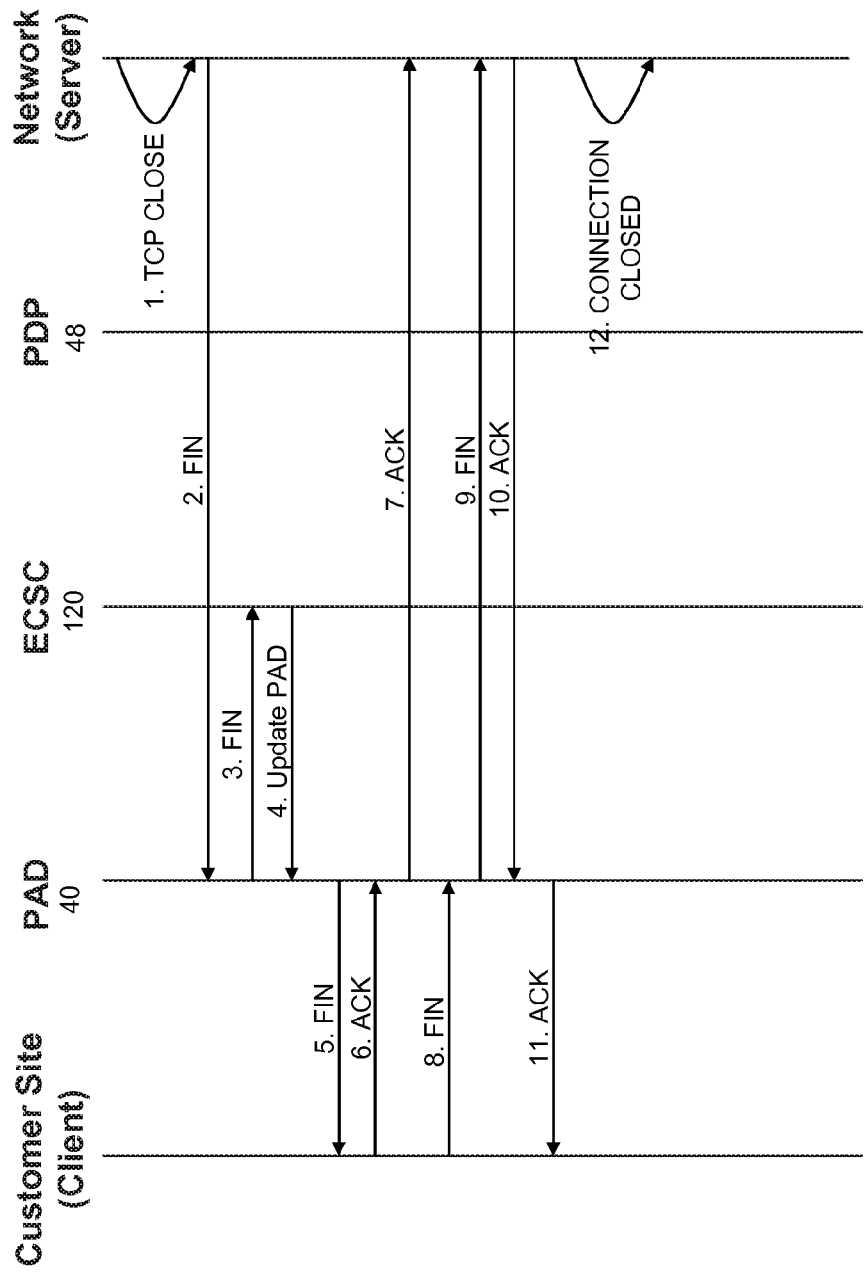
FIG. 7D illustrates exemplary signaling in a network access system in accordance with the present invention during disconnection of a TCP session.

With reference now to FIG. 7D, there is depicted a time-space diagram that illustrates exemplary network access system signaling to close a TCP connection in accordance with the present invention. While either side of a TCP connection can initiate disconnection of TCP session, in the example shown in FIG. 7D, the server application initiates closure of the TCP session by instructing its TCP agent to close the connection. Accordingly, the server's TCP agent sends a FIN segment, informing the client application that it will send no more data. In response to receipt of FIN segment, PAD 40 resets the TCP state machine for the connection to idle state 142 and passes the FIN segment to ECSC 120. ECSC 120 responds by deleting the TCP session from its active session table and by configuring PAD 40 to stop marking packets for this TCP session and to remove the session's inactivity timer and retransmission settings. PAD 40 also forwards FIN segment to the client, which acknowledges receipt of the FIN segment with an ACK that is passed to the server by PAD 40. The client application then commands its TCP agent to close the session. The client's TCP agent therefore sends a FIN message to the server's TCP agent via PAD 40. The server's TCP agent responds to the client's FIN message with an ACK that indicates to PAD 40 that the three-way handshake to close the TCP session is successful. PAD 40 accordingly deletes the state machine for the TCP session and forwards the ACK message to the client. Meanwhile, the server's TCP agent notifies the server application that the connection is closed.

Figure 7E:
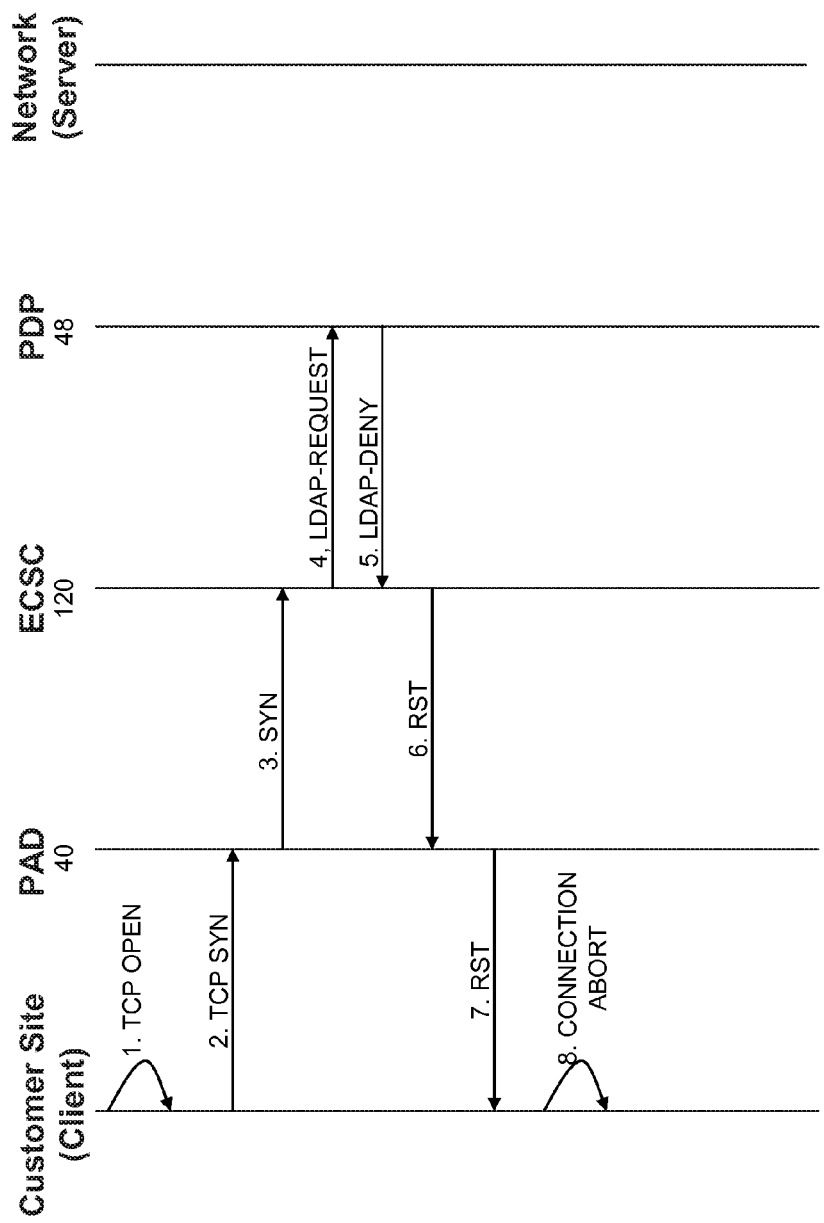
FIG. 7E depicts exemplary signaling in a network access system in accordance with the present invention in response to an authorized request for a TCP session.

Referring now to FIG. 7E, there is illustrated a time-space diagram showing exemplary network access system signaling in accordance with the present invention in response to a request for an unauthorized TCP session. As can be seen by comparison of FIG. 7E to FIG. 7C, the process is identical up until the point at which policy server 48 returns an LDAP policy decision to ECSC 120 denying the TCP session. Policy server 48 may deny the TCP session, for example, because the network lacks sufficient resources to support the requested TCP session or because the client has not subscribed to the requested high priority e-commerce service. Following denial of the TCP session, ECSC 120 issues a reset (RST) segment to PAD 40, which sends the RST segment upstream to the TCP agent at the client. When the client's TCP agent receives the RST segment, the client's TCP agent aborts the session. It should be noted that because PAD 40 does not receive a SYN segment from ECSC 120, PAD 40 does not create a state machine for the TCP session.

Figure 7F:
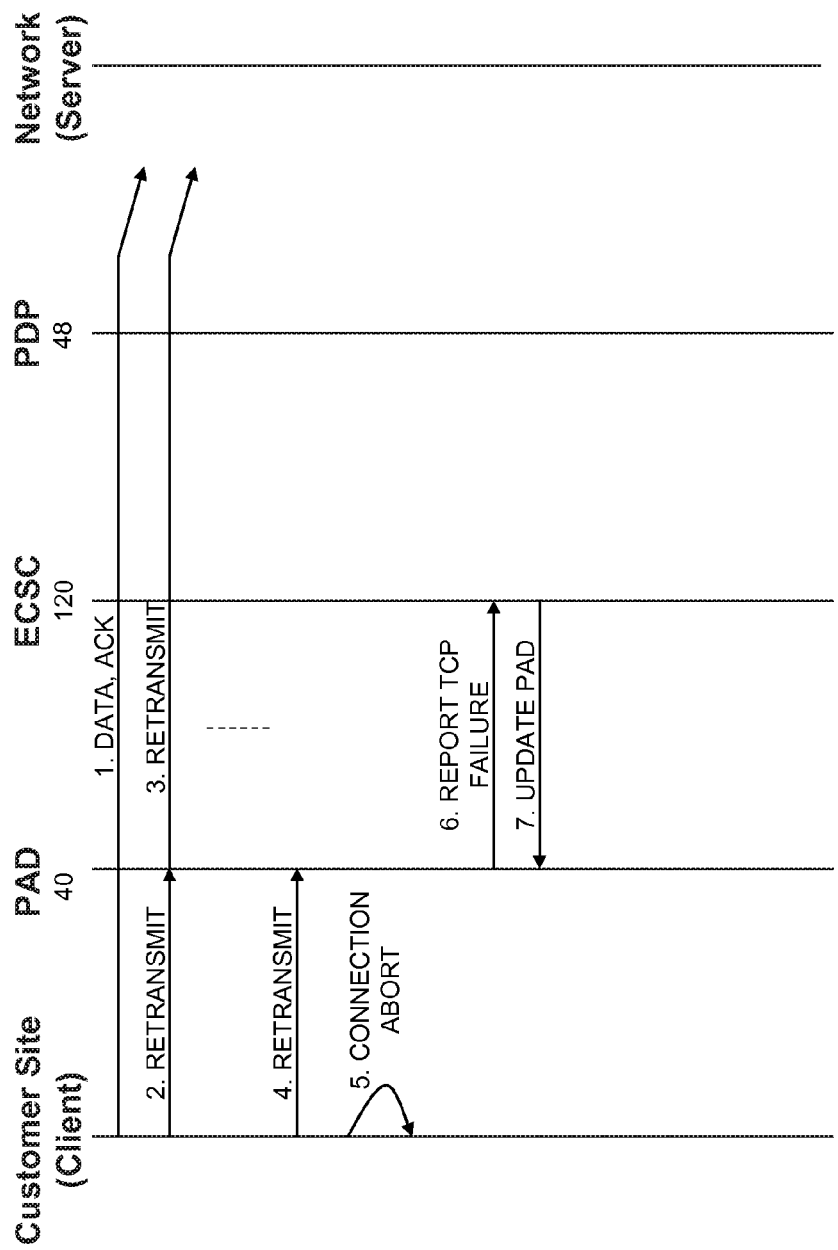
FIG. 7F illustrates exemplary signaling in a network access system in accordance with the present invention when a TCP session times out.

With reference now to FIG. 7F, there is illustrated a time-space diagram showing exemplary network access system signaling when excessive TCP retransmissions are detected. As will be appreciated, TCP sessions are normally closed through a proper disconnect, as illustrated in FIG. 7D. However, in the event of a network or server failure, the TCP session will timeout in the host and a normal disconnect will not occur. Accordingly, some mechanism must be implemented to update ECSC 120 and PAD 40 when the TCP session disconnects.

In the example shown in FIG. 7F, the route between the customer and the server is disrupted by failure of a network link or node. This failure causes the TCP agent and the client to re-transmit the data until a threshold number of retransmissions is reached. The client's TCP agent then aborts the TCP connection. Subsequently, the inactivity timer for the TCP session in PAD 40 expires. In response to expiration of the inactivity timer, PAD 40 updates state machine 140 of the TCP session to idle state 142 and reports the TCP session timeout error to ECSC 120. ECSC 120 responds to the report of the timeout error by deleting the TCP session from its active session table and instructs PAD 40 to stop marking the packets for the TCP session and to delete the configuration for this TCP session. PAD 40 then deletes the state machine for the TCP session.

Figure 7G:
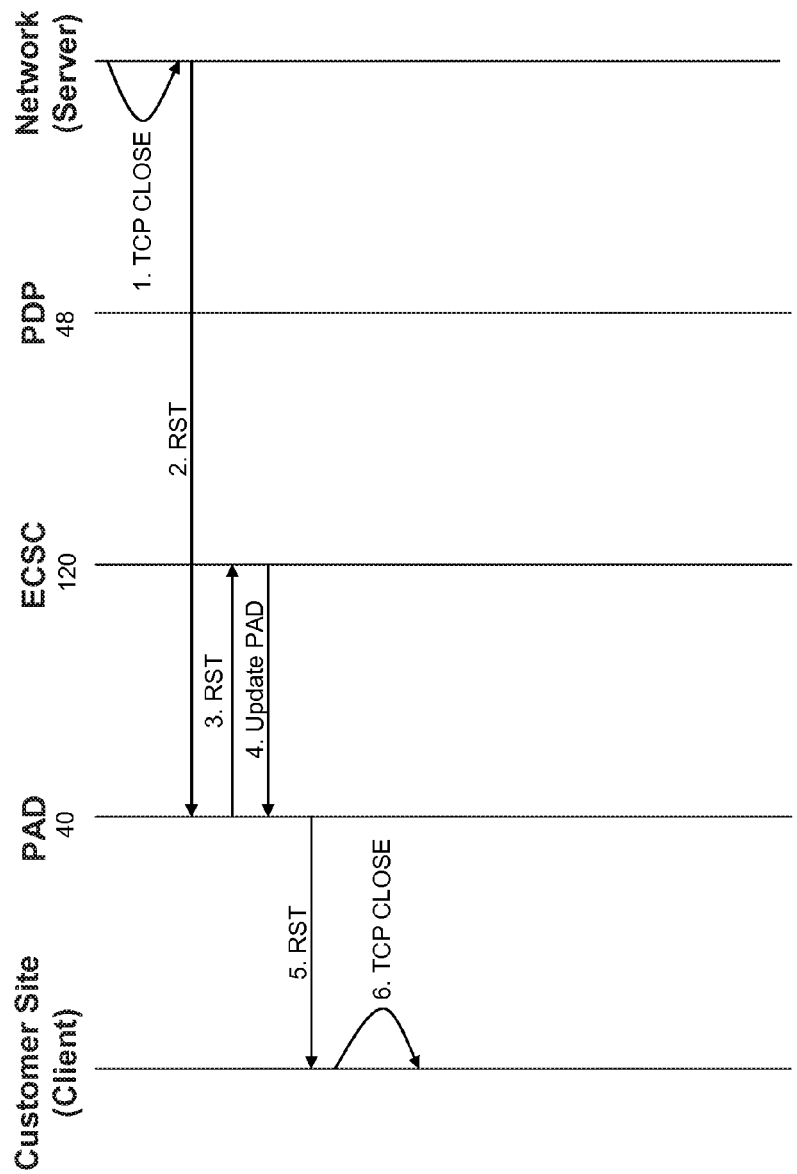
FIG. 7G depicts exemplary signaling in a network access system in accordance with the present invention when a TCP session abruptly closes.

With reference now to FIG. 7G, there is depicted a time-space diagram illustrating exemplary network access system signaling when a TCP session participant requests an abrupt close to the TCP session. As illustrated, an application, which in this case is the server application, signals an abrupt close by sending a reset (RST) segment. The application can launch the abrupt close for a number of reasons, for example, because the application wishes to abort the connection or because the TCP agent has detected a serious communication problem that cannot be resolved. In response to receipt of the RST segment, PAD 40 resets the TCP state machine 140 for the session to idle state 142 and passes the RST segment to ECSC 120. In response to receipt of the RST segment, ECSC 120 deletes the TCP session from its active session table and configures PAD 40 to stop marking packets for this TCP session. PAD 40 then deletes the TCP state machine 140 for the session and forwards the RST segment to the client. The client then closes the TCP session upon receipt of the RST segment.

Connectionless Transport Examples Using UDP Reporting Function

Figure 8A:
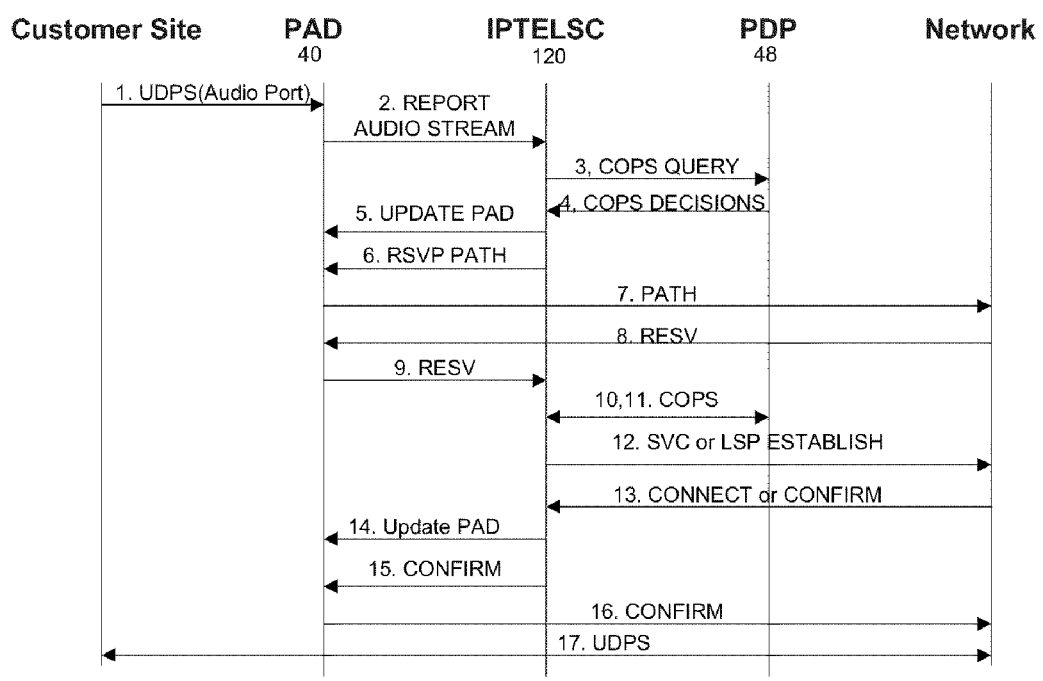
FIG. 8A illustrates exemplary signaling in a network access system in accordance with the present invention to establish a UDP (User Datagram Protocol) session having an enhanced quality of service (QoS) path.
Figure 8B:
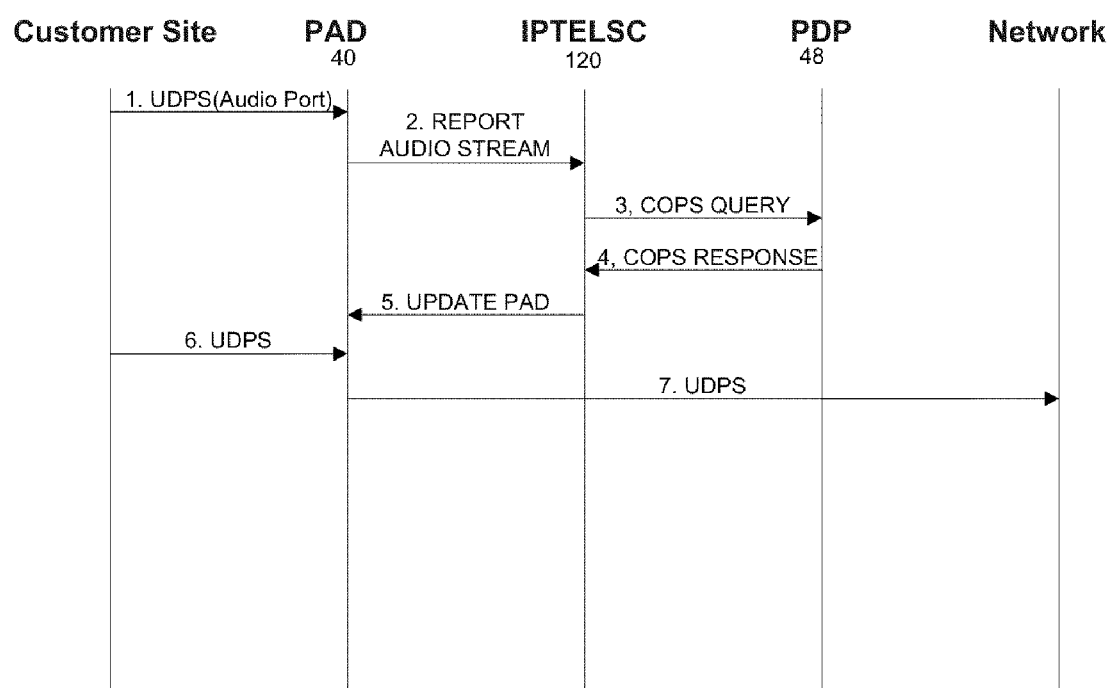
FIG. 8B depicts exemplary signaling in a network access system in accordance with the present invention in the case where packets in a UDP session receive best-efforts delivery rather than enhanced QoS.
Figure 8C:
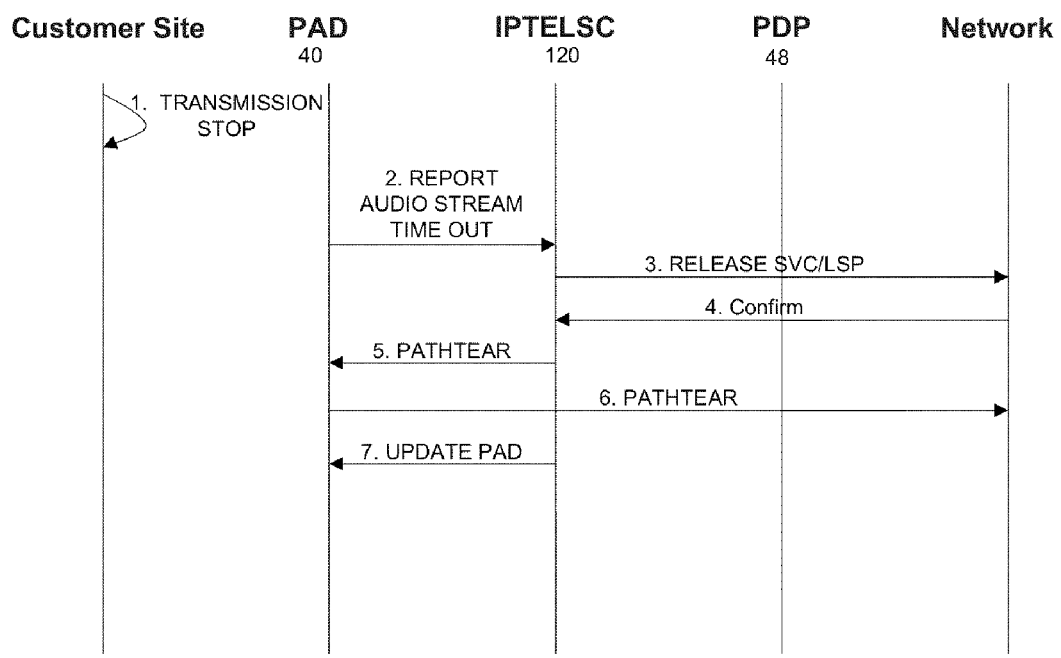
FIG. 8C illustrates exemplary signaling in a network access system in accordance with the present invention to tear down a UDP session that has timed out.

With reference now to FIGS. 8A-8C, there are depicted three examples of network access system signaling for connectionless transport protocols. In each example, the Unreliable Datagram Protocol (UDP) is employed.

Referring first to FIG. 8A, there is depicted a time-space diagram of network access system signaling in which UDP is utilized as the transport for voice data of an IP telephony session. In the example illustrated in FIG. 8A, a customer has ordered guaranteed service for his IP telephony (IPTEL) calls, but has a client that does not support the use of RSVP to reserve guaranteed service for the IPTEL calls. Nevertheless, the customer is able to obtain guaranteed service for an IPTEL call through the exchange of messages detailed below.

The process begins when a customer at the customer site invokes a client application to place an IPTEL call. The client application then obtains an unused UDP port from a pool of available ports assigned for voice data transmission. The client application then starts sending voice data encapsulated by UDP packets over the network as best-efforts traffic. PAD 40, which has been configured to detect a flow of UDP (i.e., Protocol Type (PT)=17) packets within the voice port range, detects the UDP flow and reports it to the IP Telephony Service Controller (IPTELSC) 120 within external processor 42. IPTELSC 120 queries policy server 48 for a policy decision via SPI 56, which in this example employs COPS. By reference to policy database 46, policy server 48 determines that the customer has ordered guaranteed service for his IPTEL calls and returns a policy decision to IPTELSC 120 that instructs IPTELSC 120 to provide guaranteed service for this IPTEL session, as defined by SA, DA, PT=17, SP and DP.

IPTELSC 120 accordingly configures PAD 40 with an inactivity timer for the session and instructs PAD 40 to stop reporting the occurrence of this IPTEL session. IPTELSC 120 also begins to set up a reserved bandwidth route for the IPTEL call since the customer's client application is incapable of doing so. To set up the reserved bandwidth route, IPTELSC 120 sends a RSVP PATH MESSAGE to PAD 40, which forwards the PATH MESSAGE downstream to the receiver. To indicate approval of the reservation, as well as the amount of reserved bandwidth, the receiver sends a RESV message to PAD 40, which forwards the RESV message to IPTELSC 120. A determination is then made whether a reservation of the specified bandwidth is authorized. If IPTELSC 120 has cached sufficient policy information following the previous query of policy server 48, IPTELSC 120 need not query policy server 48 regarding the bandwidth. If, however, insufficient policy information was cached in the policy cache 130 of IPTELSC 120, policy server 48 is again queried whether the specified bandwidth can be reserved. If the specified bandwidth is available for reservation by this customer, IPTELSC 120 initiates signaling via a signaling controller 128 to set up either a SVC or LSP for the IPTEL session. For an ATM core, a bi-directional SVC is set up. Alternatively, for an MPLS core, two unidirectional LSPs are set up. Another means of providing QoS to this UDP session involves IPTELSC 120 instructing marker 82 in PAD 40 to modify the differentiated service (DiffServ) field in the IP header. Once IPTELSC 120 receives a connect or confirm message from the network indicating that the QoS path has been established, IPTELSC 120 updates PAD 40 to associate the flow of UDP packets with the QoS path. In addition, IPTELSC 120 confirms that the QoS path is setup and reserved by passing a confirm message to PAD 40, which passes the confirm message to the receiver. Thereafter, voice data encapsulated in UDP packets are sent from the customer application to the receiver via the QoS path.

As shown in FIG. 8B, in the event that the query of policy server 48 results in a policy decision indicating that the customer does not have a QoS requirement for IPTEL calls, IPTELSC 120 configures PAD 40 to prevent PAD 40 from reporting the IPTEL call again. In addition, IPTELSC 120 sets an inactivity timer for the IPTEL call so that the prevention of call reporting can be deleted when the inactivity timer expires. Because no QoS path is authorized, the voice data encapsulated by UDP packets continues to be transmitted over the network as best-effort traffic.

With reference now to FIG. 8C, a time-space diagram is shown that illustrates network access system signaling utilized to tear down a QoS path in response to the expiration of a UDP session inactivity timer. While an UDP session inactivity timer can expire for a number of reasons including failure of a network link or node, in the example illustrated in FIG. 8C, the timeout event is caused by the customer application at the customer site concluding a call and ceasing transmission of voice traffic. Sometime later, when the UDP session inactivity timer expires, PAD 40 detects the timeout event and reports it to IPTELSC 120. IPTELSC 120 responds by initiating appropriate signaling to release the SVC or LSPs for the IPTEL call, and the release is confirmed by a message to IPTELSC 120. IPTELSC 120 also invokes the pathtear message to explicitly tear down the QoS path for the IPTEL call. As this message is passed from PAD 40 through the network, the pathtear message removes installed RSVP states along the QoS path. IPTELSC 120 then deletes the IPTEL call from its active session table and configures PAD 40 to delete all configured parameters for the IPTEL call.

Application-Level Examples Using SIP Signaling

Figure 9A:
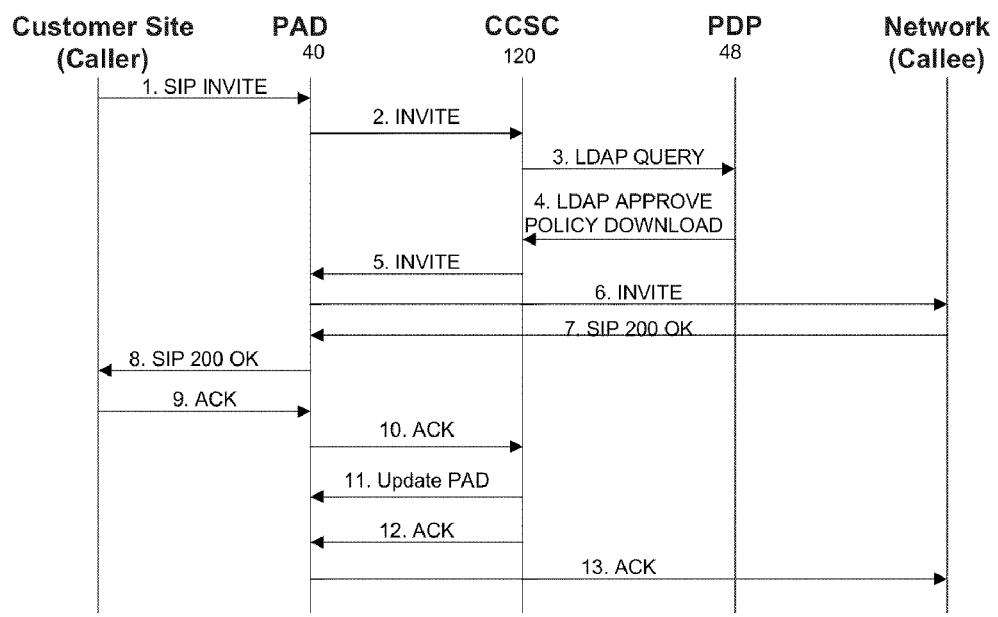
FIG. 9A depicts exemplary signaling in a network access system in accordance with the present invention during Session Initiation Protocol (SIP) call establishment.

Referring now to FIGS. 9A-9E, there are illustrated a number of time-space diagrams showing application-level SIP signaling in a network access system in accordance with the present invention. Referring first to FIG. 9A, an example of a SIP call establishment is shown. In the illustrated example, a caller at the customer site issues a SIP INVITE request to the callee in the network, for example, to invite the callee to participate in a multimedia conference call. When PAD 40 detects the invite request by the UDP or TCP port range assigned to SIP, PAD 40 passes the INVITE request to a Conference Call Service Controller (CCSC) 120. CCSC 120 then queries policy server 48 (e.g., utilizing an LDAP request) regarding whether the requested capability is approved for the customer. Importantly, to reduce the number of message exchanged between CCSC 120 and policy server 48, CCSC 120 preferably sets a flag in the query to request that policy server 48 dump the policy lookups for the SIP request into policy cache 130 of CCSC 120. In this manner, CCSC 120 can thereafter make policy decisions by reference to the cached policies and avoid unnecessary queries of policy server 48.

Assuming that policy server 48 approves the SIP session, policy server 48 sends CCSC 120 a policy decision indicating approval of the SIP session and dumps the policy rules for SIP calling into policy cache 130 of CCSC 120. In response to receipt of approval of the SIP session, CCSC 120 returns the INVITE message to PAD 40, which forwards the INVITE request toward the callee.

In response to receipt of the INVITE request, the callee returns a SIP 200 OK message to PAD 40, thereby indicating acknowledgement of the call without change in the specified SIP capability. Because there is no change in the SIP capability, PAD 40 forwards the SIP 200 OK message directly to the caller and does not pass the message to CCSC 120. The caller then acknowledges acceptance of the SIP 200 OK message via an ACK request, which PAD 40 passes to CCSC 120 to inform it of successful establishment of the SIP session. CCSC 120 then queries its policy cache 130 to approve the final capability set of the SIP call. CCSC 120 also adds the SIP session into its active session table and configures PAD 40 with an inactivity timer and other parameters to facilitate the SIP call. CCSC 120 then returns the ACK request to PAD 40, which in turns sends the ACK to the callee to complete SIP call establishment.

To obtain better performance, it is desirable to minimize message passing from PAD 40 to CCSC 120 and from CCSC 120 to policy sever 48. As discussed above, caching policy rules at CCSC 120 greatly reduces the number of required policy queries. Message passing from PAD 40 to CCSC 120 is preferably also reduced through implementation of a SIP state machine at PAD 40 that passes SIP messages to CCSC 120 only to establish, terminate, or change the capability set of a SIP session.

Figure 9B:
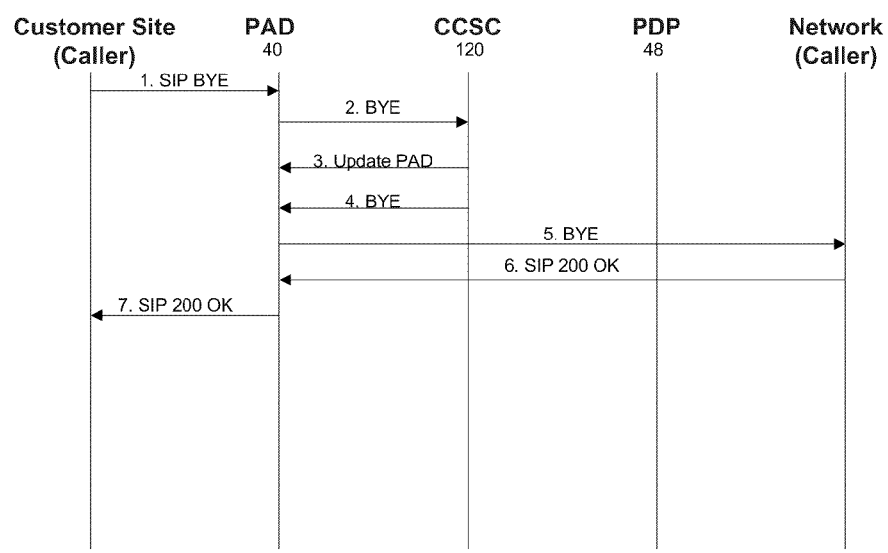
FIG. 9B illustrates exemplary signaling in a network access system in accordance with the present invention during SIP call termination.

With reference now to FIG. 9B, a time-space diagram is shown that illustrates exemplary network access system signaling for SIP call termination. In a multi-party SIP conference call, each party can only drop himself from the call, and the call is terminated after the last party leaves the call. In contrast, in a two-party SIP call, such as illustrated in FIG. 9B, either the callee or the caller can terminate the call. As shown in FIG. 9B, the caller at the customer site initiates call termination by sending a BYE request, which PAD 40 passes to CCSC 120. CCSC 120 responds to the BYE request by deleting the SIP session from its active session table and by cleaning its policy cache 130 of policy rules pertaining to the SIP session. CCSC 120 then configures PAD 40 to prevent PAD 40 from passing subsequent SIP messages from the SIP call to CCSC 120 and to delete the entire configuration for the SIP call. CCSC 120 also sends the BYE request to PAD 40, which forwards the BYE request to the callee. In response to receipt of the BYE request, the callee acknowledges the end of the SIP call by sending a SIP 200 OK message, which PAD 40 forwards to the caller without passing to CCSC 120.

Figure 9C:
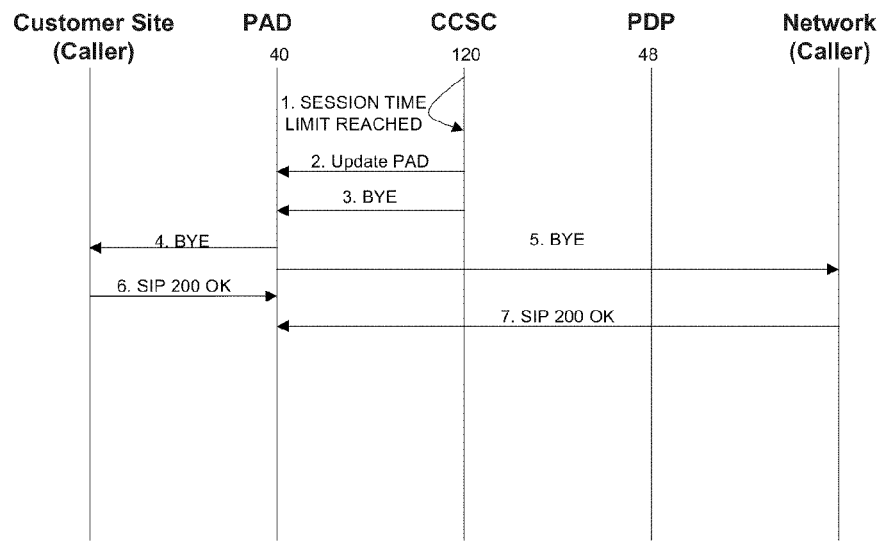
FIG. 9C depicts exemplary signaling in a network access system in accordance with the present invention to conclude a SIP call following detection of a time out by the network.

Referring now to FIG. 9C, there is illustrated a time-space diagram showing exemplary network access system signaling to end a SIP call that has exceeded the allowed duration. In the depicted example, termination of a SIP call is triggered by CCSC 120 detecting that the SIP call has exceeded the allowed duration specified by the session's ExpireTimer. The callee then issues a BYE request to terminate the call. In response to receipt of the BYE request, PAD 40 passes the BYE request to CCSC 120, which CCSC 120 deletes the SIP session from its active session table and removes associated policies from its policy cache 130. CCSC 120 then configures PAD 40 to prevent PAD 40 from passing to CCSC 120 subsequent SIP messages in the SIP call and commands PAD 40 to delete the entire configuration for the SIP call. CCSC 120 then issues a BYE request to PAD 40, which forwards the BYE request to both the caller and the callee. The caller and the callee then acknowledge the end of the SIP session via a SIP 200 OK message.

Figure 9D:
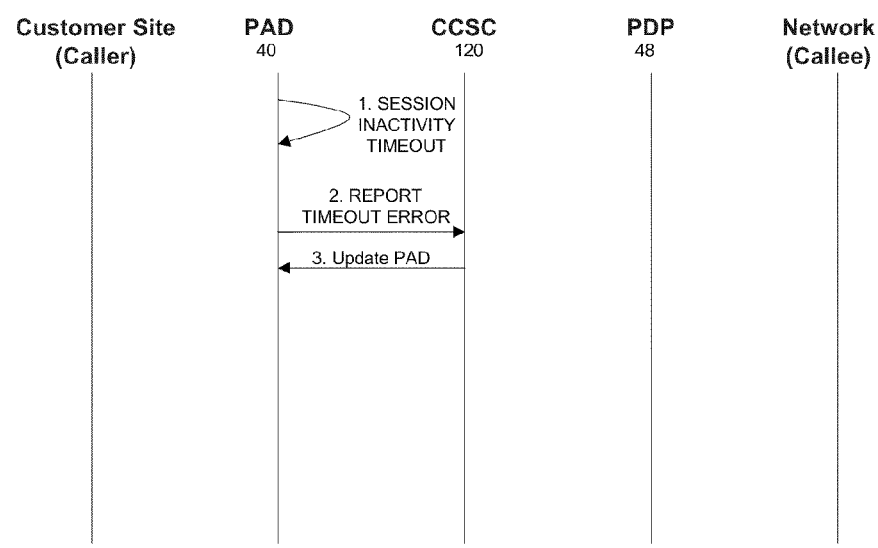
FIG. 9D illustrates exemplary signaling in a network access system in accordance with the present invention to conclude a SIP call following detection of a time out by the programmable access device.

FIG. 9D illustrates a third call termination example in which neither party to a call requests termination, but instead, both parties simply drop the SIP session. In the absence of activity in the SIP session, the inactivity timer in PAD 40 for the SIP call expires. PAD 40 then reports a timeout to CCSC 120, which deletes the SIP session from its active session table and removes associated policies from its policy cache 130. CCSC 120 then commands PAD 40 to delete the entire configuration for the SIP call.

Figure 9E:
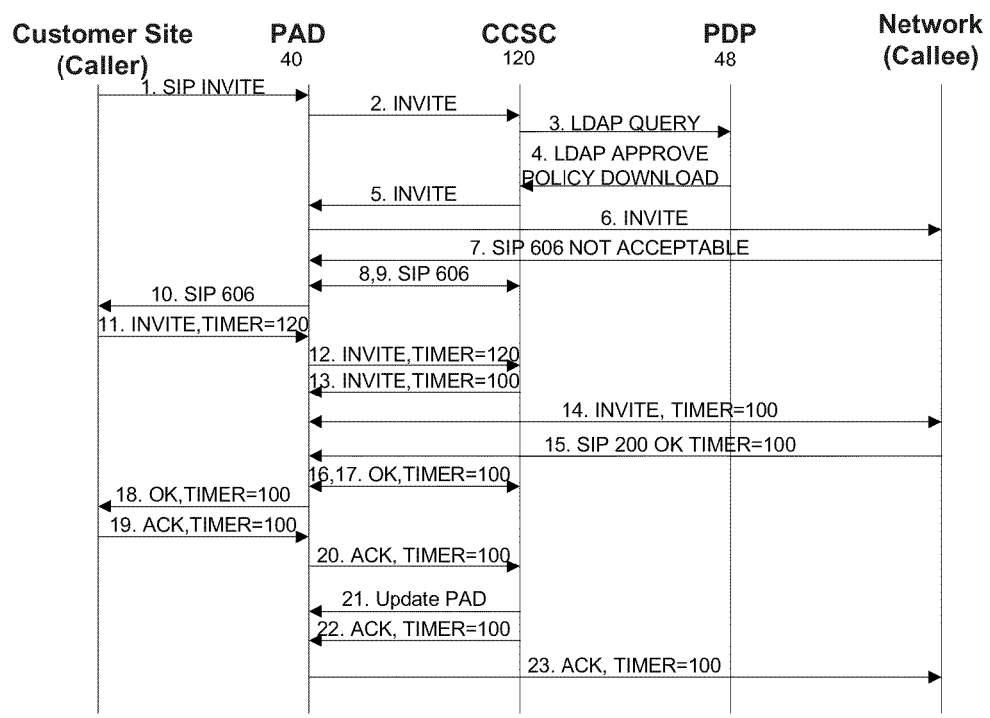
FIG. 9E depicts exemplary signaling in a network access system in accordance with the present invention during SIP call negotiation.

Referring now to FIG. 9E, there is depicted a time-space diagram showing exemplary network access system signaling during negotiation of SIP call capability requirements between a caller and a callee. As described above with respect to FIG. 9A, a SIP call is initiated by a customer application at the customer site issuing a SIP INVITE request. This INVITE request is captured by PAD 40 and passed to CCSC 120, which queries policy server 48. Policy server 48 responds with approval of the SIP call and a download of the policy rules for this SIP session (as requested in the policy query). CCSC 120 then returns the INVITE request to PAD 40, which forwards it to the callee.

However, in contrast to the example illustrated in FIG. 9A, the callee does not respond with a SIP 200 OK message confirming the SIP call. Instead, the callee responds with a SIP 606 NOT ACCEPTABLE message indicating that the requested call bandwidth is higher than that which can be supported by the access link of the callee and that only a 56 Kbps connection is available. As requested by the INVITE request, the callee response further indicates a set of media encodings, for example, that only PCM (pulse code modulation) or linear predictive coding (LPC) audio can be supported (in that order of preference). In response to receipt of the SIP 606 NOT ACCEPTABLE message, PAD 40 passes the message to CCSC 120, which queries its local policy cache 130 and approves the new capabilities set. CCSC 120 then sends the SIP 606 NOT ACCEPTABLE message back to PAD 40, which passes the message to the caller.

When the caller receives the SIP 606 NOT ACCEPTABLE response, the caller adjusts the call capability requirements and issues another INVITE request specifying a 56 Kbps bandwidth, LPC audio encoding and an ExpireTimer of 120 minutes. As before, the new INVITE request is passed to CCSC 120 by PAD 40. CCSC 120 then queries its local policy cache 130 and limits the call duration to 100 minutes according to resource availability. CCSC 120 then returns the INVITE request with an ExpireTimer of 100 minutes to PAD 40, which sends the INVITE request to the callee.

In response to receipt of this second INVITE request, the callee determines that it is able to support of all the call requirements including a call duration of 100 minutes. Accordingly, the callee responds with a SIP 200 OK message having an ExpireTimer set to 100 minutes. In response to receipt of the SIP OK response, PAD 40 sends the response to CCSC 120, which checks the SIP capability set carried in the SIP OK response by reference to its policy cache 130 and approves it. CCSC 120 then sends the SIP OK response to PAD 40, which forwards the SIP OK response to the caller. When the caller receives the SIP OK response, the caller modifies its ExpireTimer to 100 minutes and acknowledges the SIP OK response via an ACK request. PAD 40 passes the ACK response to CCSC 120, which approves the final SIP capability set carried in the ACK response. Following this approval, CCSC 120 configures PAD 40 with an inactivity timer and other parameters to facilitate the SIP call. CCSC 120 also returns the ACK message to PAD 40, which forwards the ACK message to the callee. Upon receipt of the ACK response by the callee, the SIP call is successfully established.

IP Multicast Examples

As implemented in current networks, IP multicast, that is, the delivery of packets to two or more receivers, employs an "open group" model of communication. According to the open group model, sources need only know a multicast address to which to send packets, but do not need to know the membership of a "group" participating in a multicast session and or to belong to the multicast group to which they are sending multicast packets. Moreover, there is no centralized group management entity with which group members need to register, synchronize, or negotiate, meaning that multicast group members can join or leave a multicast group at will.

Although the current open group model of multicast communication does not permit management or control of multicast communication, management and control of multicast group membership is important to both senders and receivers. For senders, it is important that only authorized sources are available to send packets to a multicast group. For example, content providers often wish to protect their exclusivity as the only source of data to a multicast group and desire to avoid denial-of-service attacks due to flooding by unauthorized sources. It is likewise important for the set of receivers in a multicast group to be controlled to restrict reception of packets to parties authorized by the sources. As an example, sources desire to restrict the receivers capable of receiving video distribution and video conferencing multicast packets. It view of the shortcomings in the conventional IP Multicast open group model outlined above, the network access system architecture of the present invention implements policy-based multicast service management as illustrated in FIGS. 10A-10H.

Figure 10A:
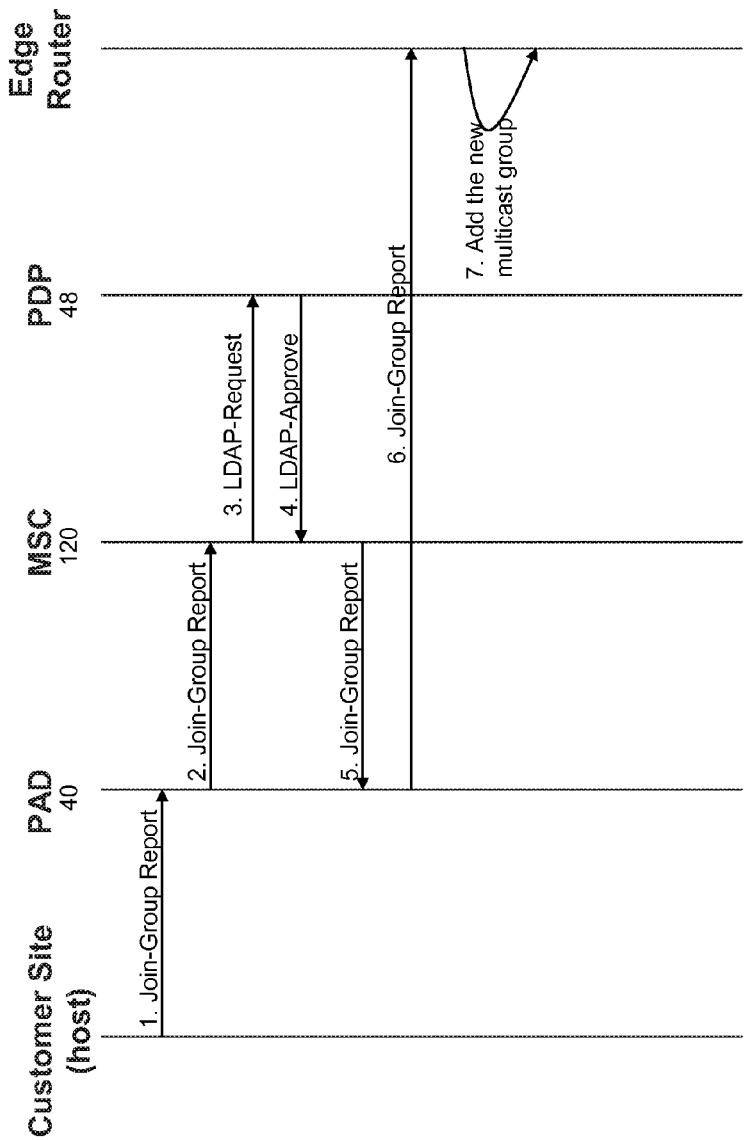
FIG. 10A depicts exemplary signaling in a network access system in accordance with the present invention to authorize registration of a multicast group.
Figure 10B:
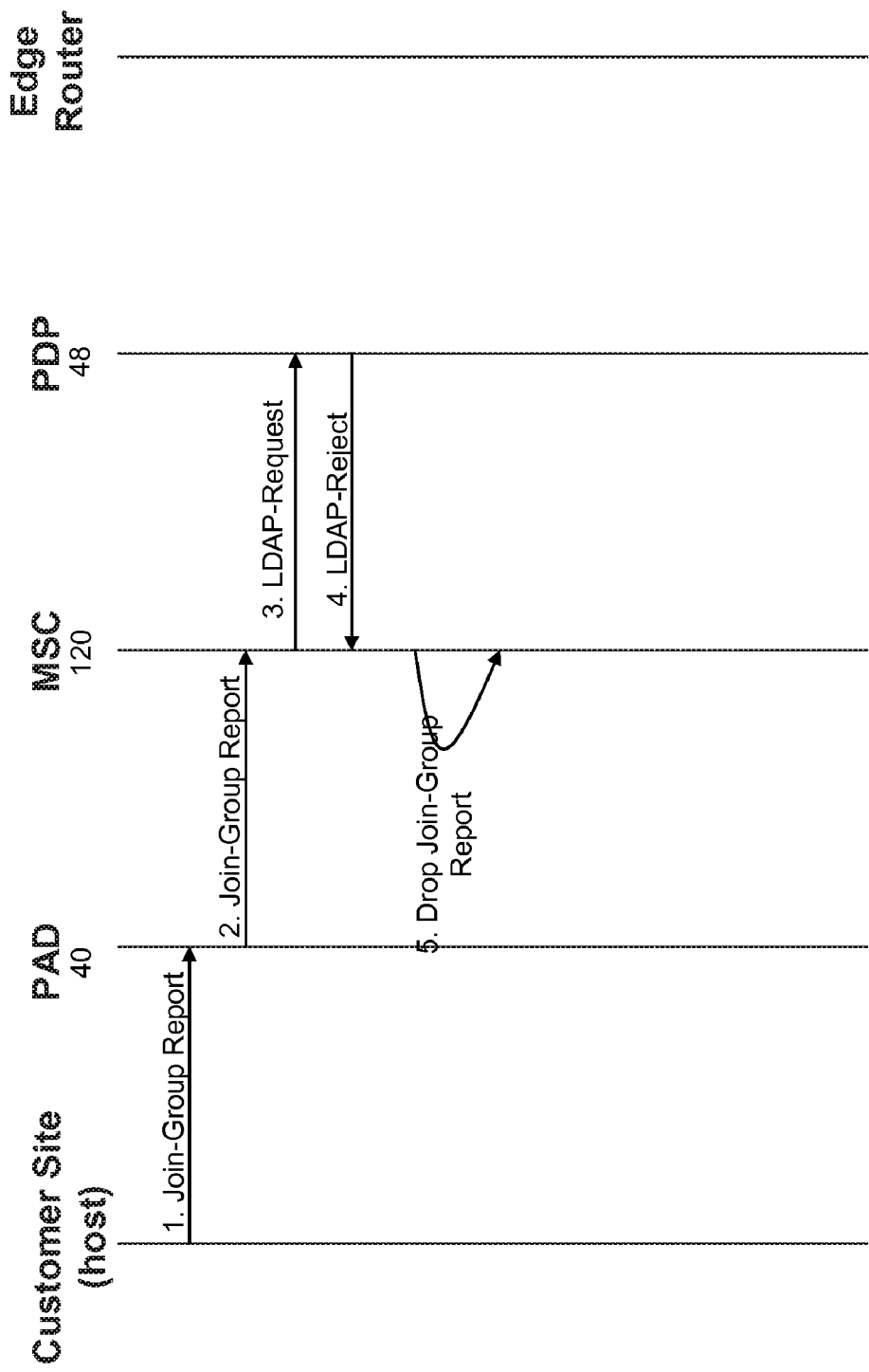
FIG. 10B illustrates exemplary signaling in a network access system in accordance with the present invention in response to an unauthorized attempt to register a multicast group.

Referring first to FIGS. 10A-10B, there are depicted two time-space diagrams showing exemplary network access system signaling to manage registration of new multicast groups in accordance with the present invention. As shown in FIG. 10A, a host at the customer site signals a desire to join a multicast group (which may be a new multicast group) by sending an Internet Group Multicast Protocol (IGMP) Join-Group Report Message to access router 44 through PAD 40. Packet header filter 80 of PAD 40, which is configured to capture IGMP messages by examining protocol type (PT=2), forwards the Join-Group Report Message to a Multicast Service Controller (MSC) 120 in external processor 42. In response to receipt of a Join-Group Report Message, MSC 120 queries policy server 48 via SPI 56, which in this case employs LDAP. Policy server 48 responds to the query by searching policy database 46 to determine if the host's IP address belongs to the eligible membership list for the multicast group.

As shown in FIG. 10B, if policy server 48 determines that the host is not eligible to join the multicast group, policy server 48 returns a policy decision to MSC 120 rejecting the Join-Group request. MSC 120 responds to rejection of the request by dropping the Join-Group Message that prevents the unauthorized host from registering a new multicast group in access router 44. MSC 120 may also write the unauthorized attempt into an event log for use in detecting fraud attempts or denial of service attacks.

Alternatively, if policy server 48 approves the host's request to join the specified multicast group, as shown in FIG. 10A, policy server 48 sends a policy decision indicating approval to MSC 120, which returns the Join-Group Report Message to PAD 40. PAD 40 then forwards the Join-Group Report message to access router 44. If the host is the first member of the multicast group on the network, access router 44 adds the multicast group reported in the Join-Group Report message to the list of multicast group memberships on the network to which the host is attached.

Figure 10C:
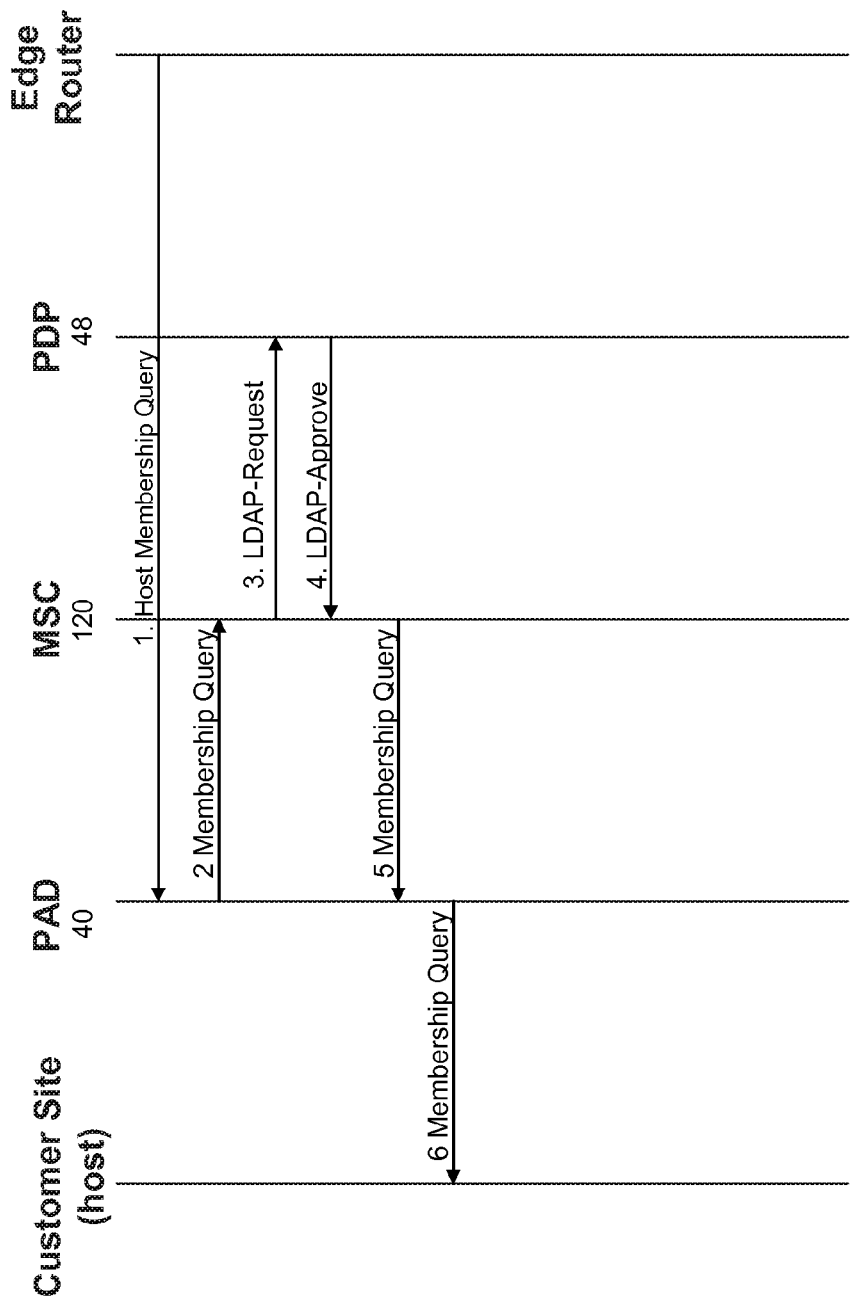
FIG. 10C depicts exemplary signaling in a network access system in accordance with the present invention in response to an authorized multicast group membership query.
Figure 10D:
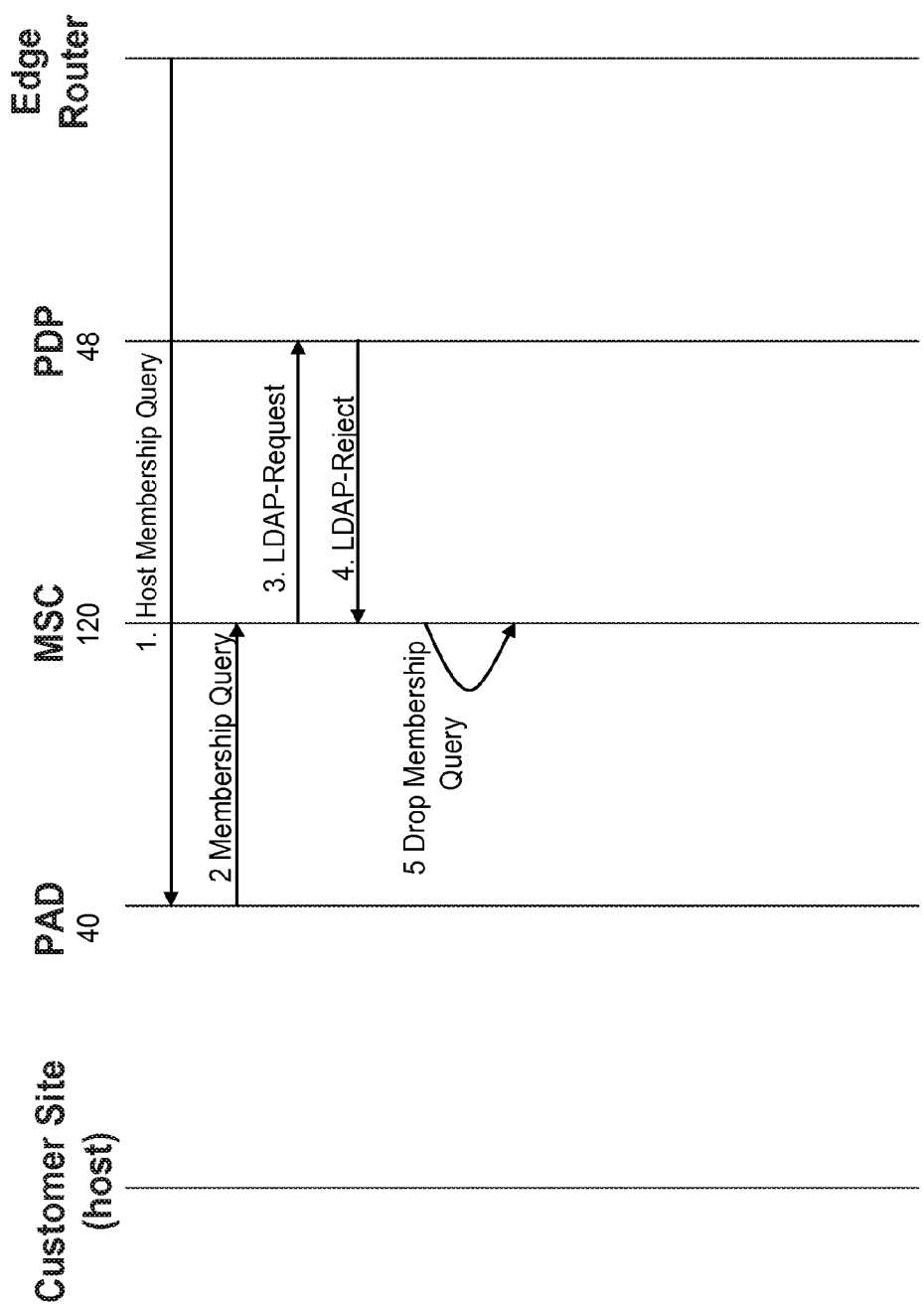
FIG. 10D illustrates exemplary signaling in a network access system in accordance with the present invention in response to an unauthorized multicast group membership query.

Referring now to FIGS. 10B and 10C there are depicted time-space diagram illustrating exemplary network access system signaling that is utilized to manage host membership queries seeking to determine the membership of a multicast group. In the example shown in FIG. 10C, PAD 40 receives an IGMP Host Membership Query message originating in the network from access router 44. Packet header filter 80 captures this IGMP message based upon its port number and passes the Host Membership Query message to MSC 120 in external processor 42. MSC 120 then queries policy server 48 via SPI 56 (which in this example employs LDAP) to ascertain whether the source address of the Host Membership Query Message is an authorized access router 44.

As shown in FIG. 10B, if policy server 48 determines by reference to policy database 46 that the Host Membership Query message is from an unidentified or unauthorized source, policy server 48 returns a policy decision to MSC 120 rejecting the Host Membership Query. In response rejection of the Query, MSC 120 drops the Host Membership Query message and writes a warning message into its event log that may indicate a denial-of-service directed toward the network by flooding of unauthorized Host Membership Query messages.

If, on the other hand, policy server 48 approves the Host Membership Query and so indicates to MSC 120, as shown in FIG. 10C, the Host Membership Query is returned to PAD 40, which forwards the Host Membership Query to the hosts in the customer site. Thus, the network access system of the prevent invention supports policy-based management of Host Membership Queries.

Figure 10E:
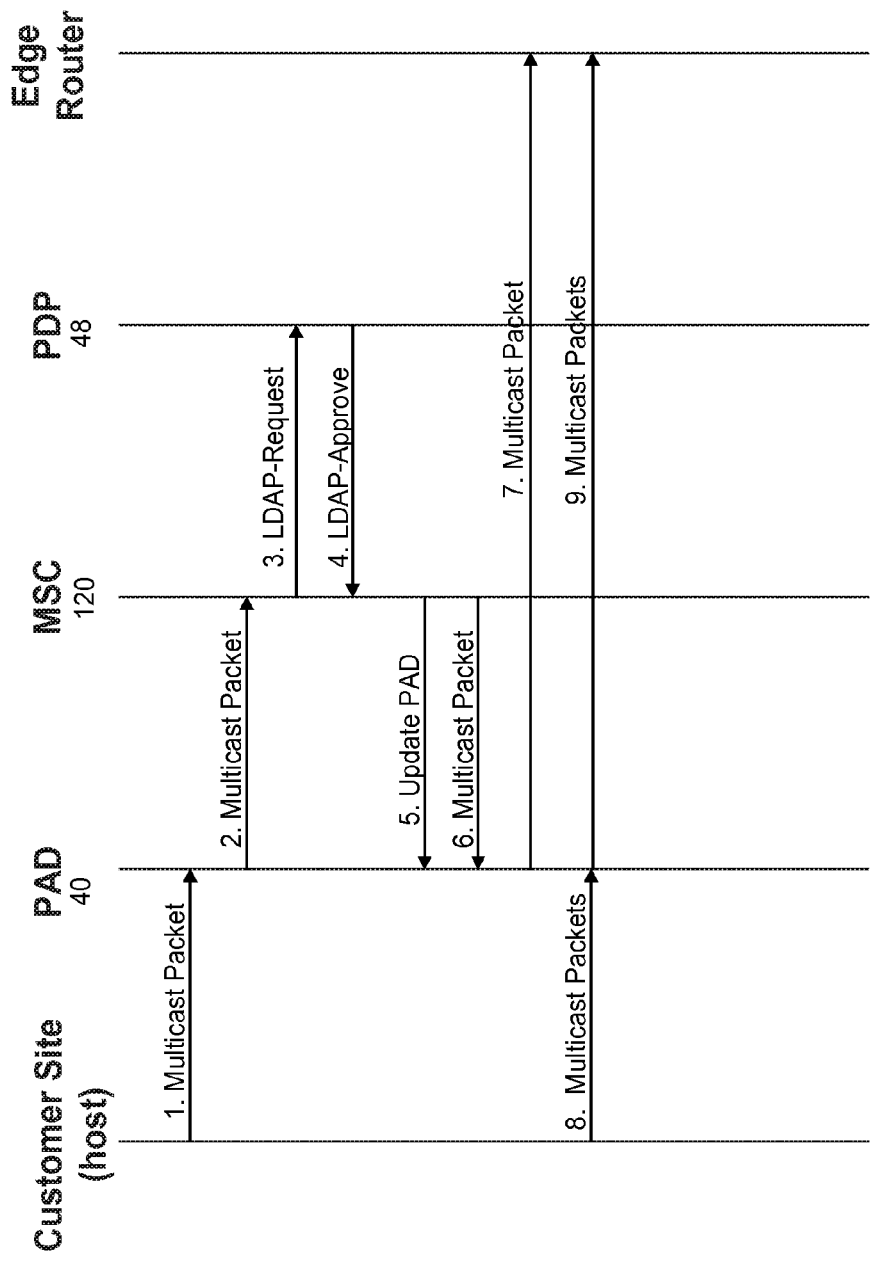
FIG. 10E depicts exemplary signaling in a network access system in accordance with the present invention in response to receipt of authorized multicast packets from outside the network.
Figure 10F:
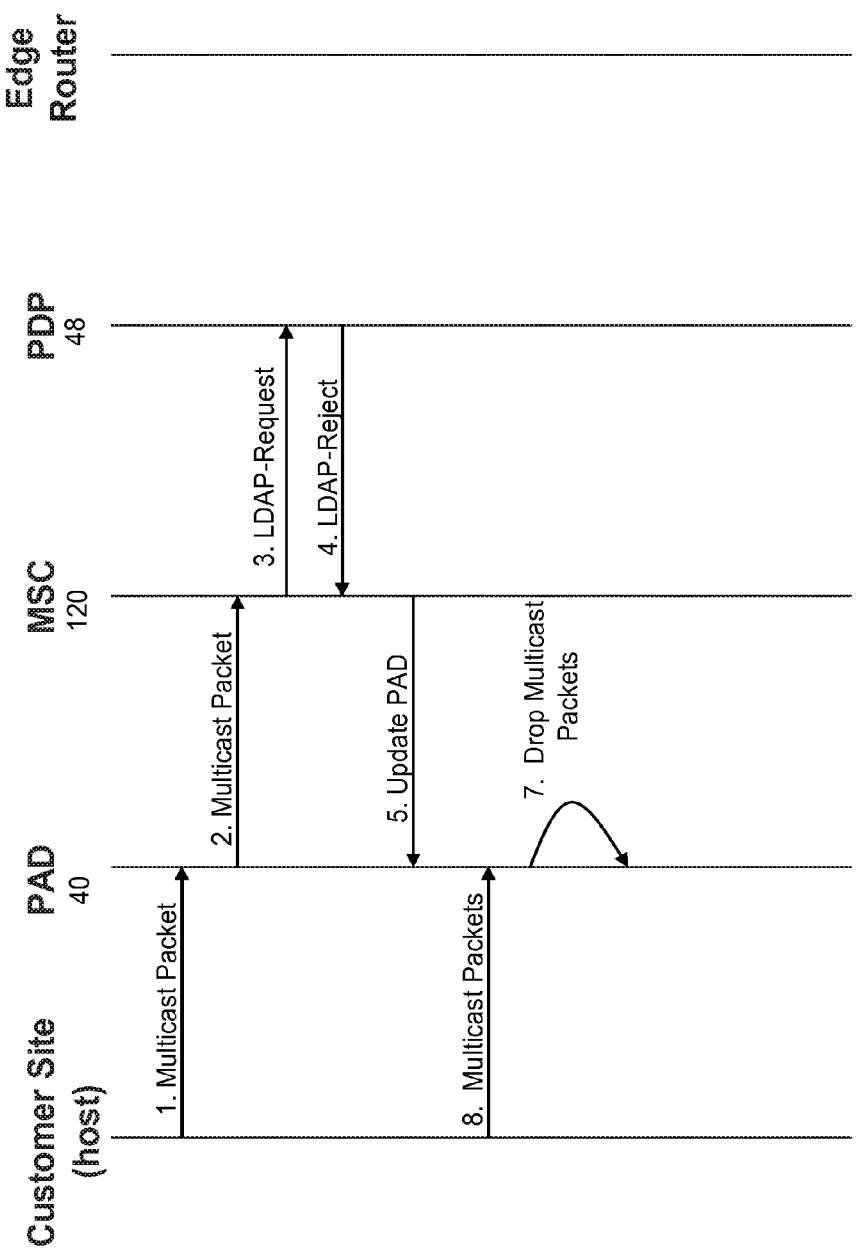
FIG. 10F illustrates exemplary signaling in a network access system in accordance with the present invention in response to receipt of unauthorized multicast packets from outside the network.

With reference now to FIGS. 10E-10F, there are depicted time-space diagrams of exemplary network access system signaling utilized to manage sending of multicast packets to the network. In the examples shown in both of FIGS. 10E-10F, a host at the customer site sends IP multicast packets addressed to a particular multicast group. When PAD 40 receives the first multicast packet, packet header filter 80 captures the packet after checking to determine whether packets having its multicast address had previously been received. PAD 40 then passes the first multicast packet to MSC 120 in external processor 42. MSC 120 queries policy server 48 via SPI 56 (which in this case employs LDAP) to determine whether the source address of the multicast packet is authorized to send multicast packets to the specified multicast group.

As shown in FIG. 10F, in response to receipt of a policy decision rejecting the sending of the multicast packet (e.g., because the source sending the multicast packet is unidentified or unauthorized), MSC 120 configures PAD 40 to drop multicast packets for this combination of source and multicast address and writes a warning message into the event log that may indicate a denial-of-service attempt by a particular source flooding multicast packets onto the network. Alternatively, if MSC 120 receives a policy decision from policy server 48 approving the multicast packet as shown in FIG. 10E, MSC 120 configures PAD 40 to directly forward multicast packets for this combination of source and multicast address to access router 44 and returns the first multicast packet to PAD 40. PAD 40 then forwards the first multicast packet to access router 44 and forwards all subsequent multicast packets in the flow directly to access router 44 without passing them to MSC 120. Thus, the network access system of the present invention utilizes policy-based decisions to permit ingress of authorized multicast packets and prevent ingress of unauthorized packets.

Figure 10G:
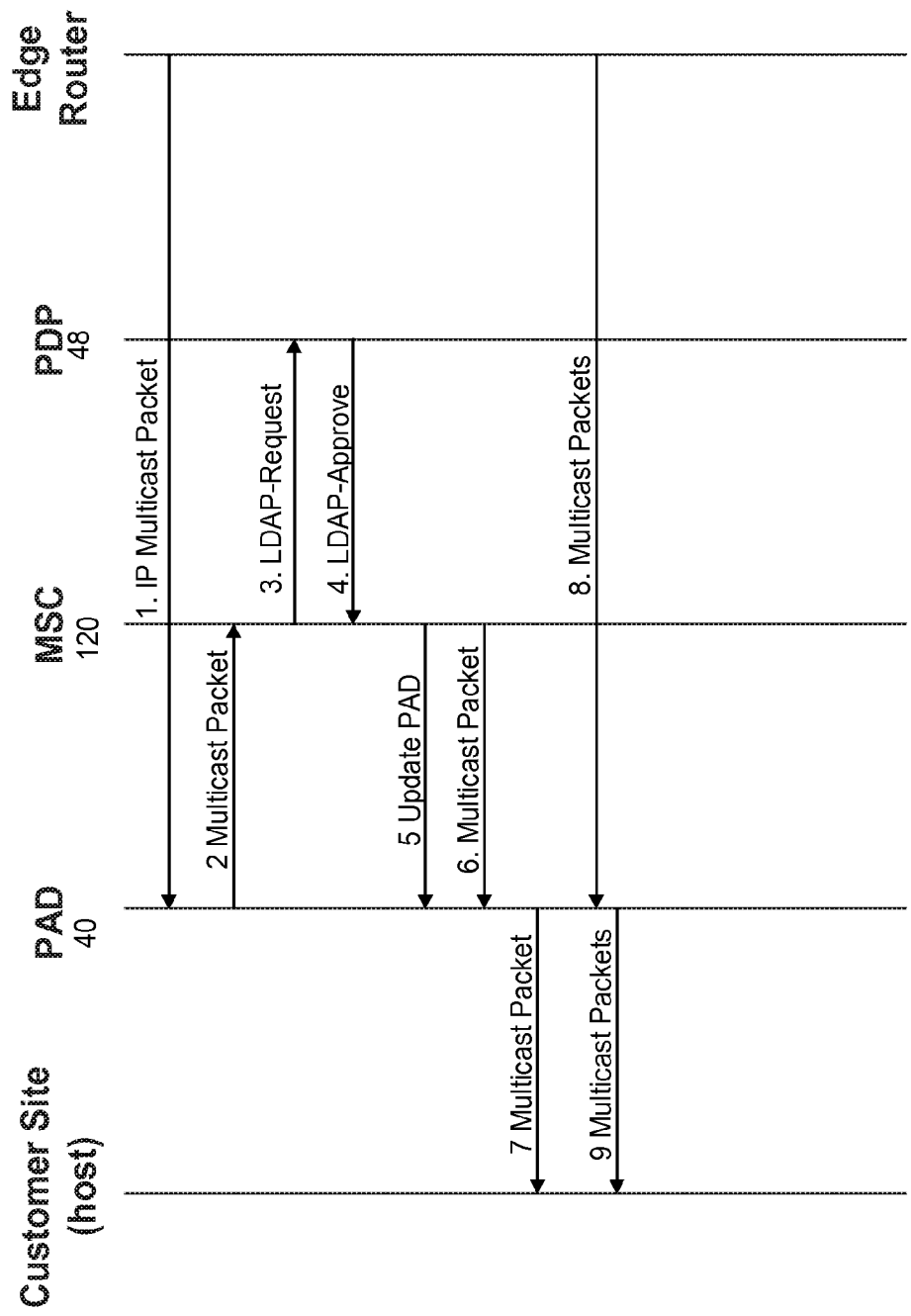
FIG. 10G depicts exemplary signaling in a network access system in accordance with the present invention in response to receipt of authorized multicast packets from the network.
Figure 10H:
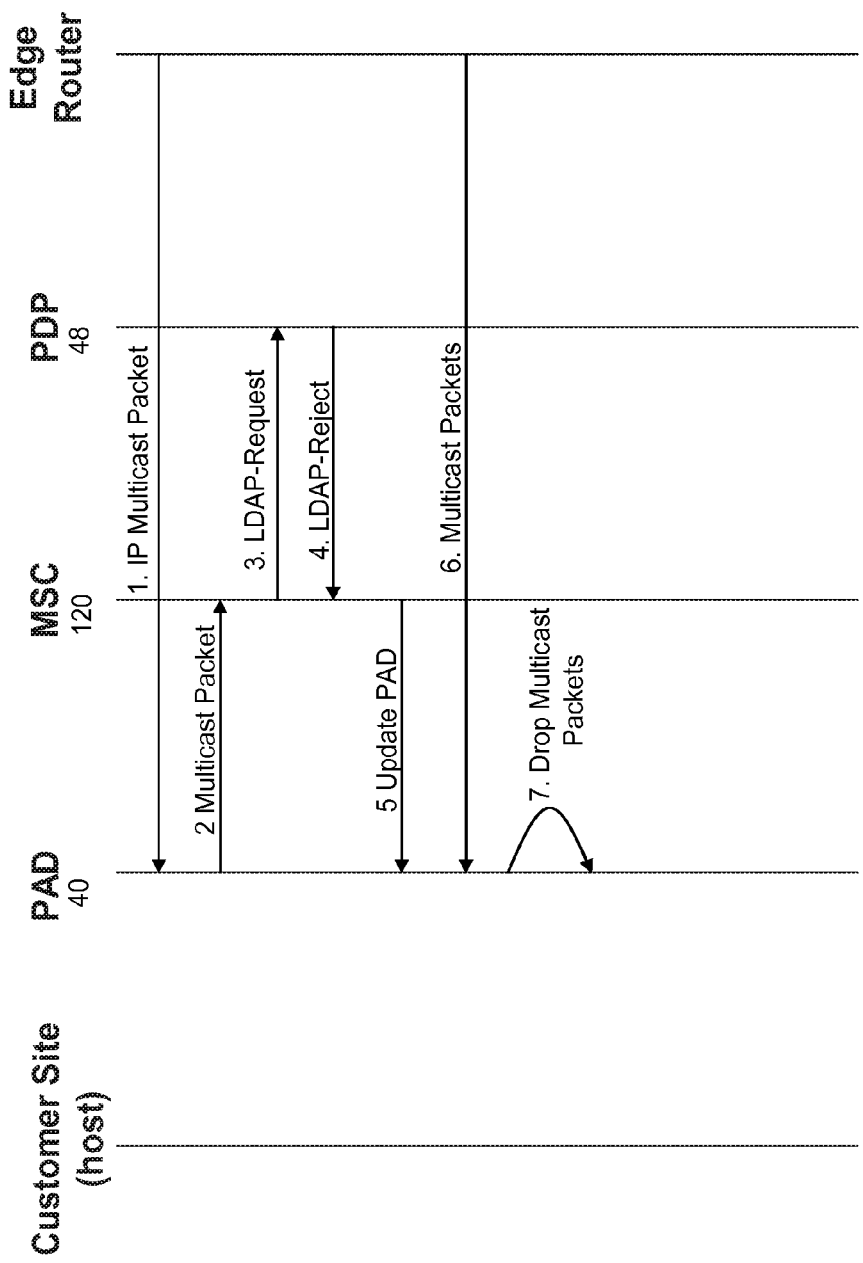
FIG. 10H illustrates exemplary signaling in a network access system in accordance with the present invention to handle unauthorized multicast packets received from the network.

With reference now to FIGS. 10G-10H, there are illustrated time-space diagrams of exemplary network access system signaling utilized to manage the receipt of multicast packets from the network. In the example shown in FIGS. 10G and 10H, access router 44 receives IP multicast packets from the network and forwards them to PAD 40. In response to receipt of the first multicast packet, packet header filter 90 of PAD 40 captures the multicast packet after checking to determine whether a packet having its multicast address had previously been received. Packet header filter 90 then passes the first multicast packet to MSC 120 in external processor 42, which queries policy server 48 to determine whether the source address of the multicast address is authorized to send multicast packets to the specified multicast group.

As shown in FIG. 10H, if policy server 48 determines that receipt of multicast packets is unauthorized, for example, because the source of the multicast packets is unidentified or unauthorized, policy server 48 sends MSC 120 a policy decision rejecting receipt of the multicast packet. In response to rejection of receipt of the multicast packet, MSC 120 configures PAD 40 to drop multicast packets for this combination of source and multicast address and writes a warning message into the event log that may indicate unauthorized multicast packets from the specified source address attempting to flood the sub-network in the customer site. As a result, subsequent multicast packets containing the same combination of source and multicast address are dropped by PAD 40.

Alternatively, as shown in FIG. 10G, if policy server 48 approves receipt of the multicast packet, MSC 120 configures PAD 40 to directly forward subsequent packets containing the same combination of source and multicast address directly to the customer site. MSC 120 also returns the first multicast packet to PAD 40, which forwards the first multicast packet and subsequent multicast packets to the customer site. As illustrated in FIG. 10H, subsequent multicast packets in the flow are forwarded by PAD 40 directly to the customer site without passing them to MSC 120.

CONCLUSION

As has been described, the present invention introduces a distributed network access system architecture. The distributed network access system architecture of the present invention replaces a conventional monolithic edge router with a programmable access device containing at least filtering and forwarding functionality, an external processor having one or more service-specific service controllers that implement policy-based control of the PAD, and an access router that performs basic routing. This distributed architecture has numerous benefits over conventional monolithic router architectures, including scalability, flexibility, extensibility, interoperability, security, and service provisioning.

The network access architecture of the present invention achieves superior scalability as compared to conventional monolithic routers by virtue of the distribution of functionality among three logical modules: a programmable access device, an external processor providing service control, and an access router. In particular, by separating the routing performed by the access router from the functionality implemented by the programmable access device and external processor, additional traffic and services can be handled without overloading the access router simply by adding external processor modules and programmable access devices according to service requirements and customer demand. In addition, as Internet traffic patterns continue to change from locally concentrated to globally distributed, the ability to apply service and policy control at the network access point separately from regional routing provides a more scalable design for forwarding traffic toward distant destinations.

The distributed network access system architecture of the present invention also provides improved flexibility. Such flexibility is a natural outgrowth of the ability of a service provider and/or customer to implement policies that govern the service control and programmability of functional modules of the programmable access device. For example, the packet header filters of the programmable access device can be configured to distinguish packet flows based on any arbitrary combination of SA, DA, TOS/DSCP, PT, SP, and DP, as well as higher-layer protocol information, such as TCP, SIP, and IGMP. In addition, the monitors of the programmable access device can be programmed by the service controllers of the external processor to collect statistics for arbitrary combinations of SA, DA, TOS/DSCP, PT, SP, DP, or other fields and to report on events (e.g., excessive TCP retransmissions and RTP/UDP inactivity) based upon the collected statistics. One particularly useful application of such monitoring is tracking statistics for different layer-2, layer-3, layer-4 and higher layer traffic types to ensure that active SLAs are maintained throughout the network. This policy-based approach for providing dynamic SLA support in the network is a more flexible solution than the current TDM (Time Division Multiplexing) approach to SLAs.

The advantage of extensibility arises in part because of the service-specific control provided by the service controllers in the external processor. Such service-specific control can be implemented either with dedicated service controllers or with generic controllers that each support service-specific APIs. Regardless of the chosen implementation, new services can be introduced simply by adding new service controllers or modifying existing service controllers. The addition of new services does not require any alteration to the programmable access device, access router, or other service controllers. Thus, other services are not disrupted during service upgrades. Moreover, because the service controllers are independent of the programmable access device and access router, the development of new services and upgrading of existing services is not dependent upon vendors of proprietary hardware, which greatly reduces the time and cost for developing or upgrading services.

The extensibility of the present invention is also attributable to the additional monitoring functions that may be implemented in the programmable access device, for example, to verify conformance to standards, debug code, and assist fault diagnosis by saving and reporting memory dumps and other related information to the service controllers. Such capability is not integrated into conventional switches or routers and is usually achieved only by the addition of external network monitoring devices. The enhanced usage monitoring provided by the present invention enables a service provider to sell network resources (i.e., capacity) dynamically while still conforming to SLAs. This not only improves network utilization, but also automates traffic engineering, which reduces network management expenses.

As noted above, the distributed network access system of the present invention distributes network access functionality among a programmable access device, an external processor providing service control, and an access router. Because these different components communicate via well-defined interfaces, interoperability is not dependent upon all the hardware or software components being developed by the same vendor.

The present invention also provides enhanced security against theft of services and network attacks. For example, the external processor may be maintained in a secure environment while leaving the forwarding functions of the programmable access device in a less-secure environment. In addition, security software and/or hardware can easily be integrated into the external processor so that sessions to configure the programmable access device from IP addresses other than its master external processors (as well as other unauthorized communication) are denied by the packet header filter of the programmable access device without being passed into the network.

The present invention also has enhanced service provisioning. Since the programmable access device intercepts network, transport and application level messages, thereby enabling the identification of applications and users, the network access system of the present invention can establish appropriate priorities for or provide desired bandwidth to data flows of user applications. For example, by employing RSVP and a LAN subnet bandwidth manager (SBM), a customer application can be provided with guaranteed bandwidth and priority end-to-end across local and wide area networks. Importantly, the policies that enable customer applications to reserve bandwidth, perform admission control, and prioritize traffic streams based upon available network capacity can be determined not only by the service provider but also by customers. Thus, customer applications can interact with service provider network resources to dynamically provision services and provide applications with a guaranteed quality of service. This network-based provisioning invoked by policy control replaces time-consuming and error-prone OSS (Operation and Support System) provisioning, thereby reducing the intensity and the cost of the network provisioning for IP-centric customer applications.

Even with the above advantages, the distributed network access system architecture of the present invention can provide a cost-effective network solution. Currently, the trend is for service providers to push more "intelligent" and therefore more expensive devices to the edge of their network designs. However, this design requires customers to purchase intelligent and therefore expensive CPEs (Customer Premises Equipment). In contrast, the distributed network access system architecture of the present invention supports relatively inexpensive PADs, which enables customers to purchase sufficient intelligence to provide service delivery without undue expense.

While the invention has been particularly shown and described with reference to a preferred embodiment, it will be understood by those skilled in the art that various changes in form and detail may be made therein without departing from the spirit and scope of the invention. For example, although aspects of the present invention have been described with respect to a computer system executing software that directs the functions of the present invention, it should be understood that present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method comprising:
   parsing a message, by an external processor, to determine a type of communication service;
   selecting, by the external processor, one of a plurality of service controllers in response to the determined type of communication service;
   generating, by the external processor, a control signal based on a policy associated with the one service controller; and
   determining, by the external processor, a configuration parameter for enforcing the policy on a connection between a first network and a second network.

2. A method according to claim 1, wherein the external processor includes a controller configured to interface with a programmable access device (PAD) to enforce the policy.

3. A method according to claim 2, wherein the plurality of service controllers includes primary and secondary service controllers for a particular service, and wherein the secondary service controller provides the particular service to the programmable access device if the primary service controller fails.

4. A method according to claim 3, wherein the service controllers are located within the external processor, the external processor being physically and functionally independent from a policy server.

5. A method according to claim 2, wherein the external processor and the PAD are physically and functionally independent from a policy server.

6. A method according to claim 1, wherein the external processor is a stand-alone hardware, and includes the plurality of service processors and a message processor configured to execute the parsing of the message.

7. A method according to claim 1, wherein the external processor further includes a plurality of message processors, and is configured to service a plurality of programmable access devices via the respective message processors.

8. A method according to claim 1, further comprising:
   initiating setup or teardown of an access network connection between the first network and the second network according to the one service controller.

9. A method according to claim 1, wherein the external processor includes a policy cache that selectively caches policies obtained from a policy server.

10. A method according to claim 1, wherein the external processor includes a reporting processor, the method further comprising:

receiving a reporting event, at the reporting processor, for the one service controller.

11. A method according to claim 1, wherein the service controllers include either a conference call service controller, a commerce service controller, an internet protocol telephony service controller, a reserved bandwidth service controller, a multicast service controller, or a combination thereof.

12. A method according to claim 1, further comprising:

determining to cache the policy at the one service controller based upon a query frequency of the policy.

13. An apparatus comprising:

a message processor configured to parse a message and to determine a type of communication service;

a plurality of service controllers coupled to the message processor, wherein one of the service controllers is selected in response to the determined type of communication service, wherein the one service controller is configured to generate a control signal based on a policy associated with the one service controller; and a programmable access device (PAD) controller coupled to the one service controller and configured to determine a configuration parameter for enforcing the policy on a connection between a first network and a second network.

14. An apparatus according to claim 13, wherein the programmable access device controller is configured to interface with a programmable access device (PAD) to enforce the policy.

15. An apparatus according to claim 14, wherein the plurality of service controllers includes primary and secondary service controllers for a particular service, and wherein the secondary service controller provides the particular service to the programmable access device if the primary service controller fails.

16. An apparatus according to claim 13, wherein the apparatus is a stand-alone hardware.

17. An apparatus according to claim 13, further comprising:

a plurality of message processors including the message processor, wherein the apparatus is further configured to service a plurality of programmable access devices via the respective message processors.

18. An apparatus according to claim 13, wherein setup or teardown of an access network connection between the first network and the second network is initiated according to the one service controller.

19. A system comprising:

an external processor including a plurality of service controllers, wherein one of the service controllers is configured to generate a control signal based on a policy, and to determine a configuration parameter for enforcing the policy using the control signal to connect a first network and a second network; and a plurality of programmable access devices coupled to the external processor, wherein one of the programmable access device receives the configuration parameter for use in forwarding one or more packets from the first network to the second network.

20. A system according to claim 19, wherein the plurality of service controllers includes primary and secondary service controllers for a particular service, and wherein the secondary service controller provides the particular service to the programmable access device if the primary service controller fails.

* * * * *